United States Patent
Ihara et al.

(10) Patent No.: US 10,069,168 B2
(45) Date of Patent: Sep. 4, 2018

(54) ELECTROLYTIC SOLUTION AND BATTERY

(75) Inventors: Masayuki Ihara, Fukushima (JP); Kiyohiko Suzuki, Fukushima (JP); Akinori Kita, Fukushima (JP); Tadahiko Kubota, Kanagawa (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 1109 days.

(21) Appl. No.: 12/123,840

(22) Filed: May 20, 2008

(65) Prior Publication Data

US 2008/0292971 A1 Nov. 27, 2008

(30) Foreign Application Priority Data

May 21, 2007 (JP) ................ 2007-134227

(51) Int. Cl.
| | | |
|---|---|---|
| *H01M 10/0569* | (2010.01) | |
| *H01M 10/052* | (2010.01) | |
| *H01M 10/0525* | (2010.01) | |
| *H01M 10/0567* | (2010.01) | |
| *H01M 10/0568* | (2010.01) | |
| *H01M 4/133* | (2010.01) | |
| *H01M 4/134* | (2010.01) | |
| *H01M 10/0587* | (2010.01) | |

(52) U.S. Cl.
CPC ..... *H01M 10/0569* (2013.01); *H01M 10/052* (2013.01); *H01M 10/0525* (2013.01); *H01M 10/0567* (2013.01); *H01M 10/0568* (2013.01); *H01M 4/133* (2013.01); *H01M 4/134* (2013.01); *H01M 10/0587* (2013.01); *H01M 2300/0037* (2013.01)

(58) Field of Classification Search
None
See application file for complete search history.

(56) References Cited

U.S. PATENT DOCUMENTS

| | | | |
|---|---|---|---|
| 5,529,859 A * | 6/1996 | Shu et al. | 429/331 |
| 5,633,099 A | 5/1997 | Yokoyama et al. | |
| 5,659,062 A | 8/1997 | Yokoyama et al. | |
| 5,847,188 A | 12/1998 | Yokoyama et al. | |
| 6,436,582 B1 * | 8/2002 | Hamamoto et al. | 429/340 |

(Continued)

FOREIGN PATENT DOCUMENTS

| | | |
|---|---|---|
| JP | HEI 07-282849 | 10/1995 |
| JP | 1997-251862 | 9/1997 |

(Continued)

OTHER PUBLICATIONS

Japanese Patent Office corresponding to Japanese Serial No. P2007-134227 dated Aug. 11, 2009.

(Continued)

*Primary Examiner* — Yun Qian
(74) *Attorney, Agent, or Firm* — K&L Gates LLP

(57) ABSTRACT

A battery capable of improving high-temperature characteristics is provided. The battery includes a cathode, an anode and an electrolytic solution. A separator provided between the cathode and the anode is impregnated with the electrolytic solution. A solvent of the electrolytic solution includes a main solvent such as a cyclic carbonate which includes halogen and a sub solvent such as carbonate dimer.

7 Claims, 5 Drawing Sheets

(56) References Cited

U.S. PATENT DOCUMENTS

| | | | |
|---|---|---|---|
| 6,566,015 B1 | 5/2003 | Yamada et al. | |
| 2005/0181277 A1* | 8/2005 | Koga et al. | 429/221 |
| 2006/0127777 A1* | 6/2006 | Ihara et al. | 429/326 |
| 2006/0147808 A1* | 7/2006 | Xiao et al. | 429/326 |

FOREIGN PATENT DOCUMENTS

| | | | | |
|---|---|---|---|---|
| JP | 1998-189046 | | 7/1998 | |
| JP | 11-176470 | * | 7/1999 | ............ H01M 10/40 |
| JP | 11-191430 | * | 7/1999 | ............ H01M 10/40 |
| JP | 2000-133304 | | 5/2000 | |
| JP | 2000-182665 | | 6/2000 | |
| JP | 2000-182669 | | 6/2000 | |
| JP | 2001-057238 | | 2/2001 | |
| JP | 2001-085056 | | 3/2001 | |
| JP | 2001-210326 | | 8/2001 | |
| JP | 2002-110235 | | 4/2002 | |
| JP | 3294400 | | 4/2002 | |
| JP | 3393620 | | 1/2003 | |
| JP | 2004-079426 | | 3/2004 | |
| JP | 2005-228683 | | 8/2005 | |
| JP | 2006-004746 | | 1/2006 | |
| JP | 2006-004747 | | 1/2006 | |
| JP | 2006-080008 | | 3/2006 | |
| JP | 2006-172811 | | 6/2006 | |
| JP | 2006-331866 A | | 12/2006 | |
| JP | 2006-351337 | | 12/2006 | |
| JP | 2007-005242 | | 1/2007 | |
| JP | 2007005242 | * | 1/2007 | ............ H01M 10/00 |
| JP | 2007-080620 | | 3/2007 | |
| JP | 2007-095380 | | 4/2007 | |
| JP | 2007-115583 | | 5/2007 | |

OTHER PUBLICATIONS

Japanese Office Action dated Jun. 5, 2012 for Japanese Application No. 2009-236370.

Korean Office Examination Report issued in connection with related Korean Patent Application No. KR 20080046737 dated Mar. 19, 2015 with English translation.

Korean Office Action dated Apr. 27, 2017 in corresponding Korean Application No. 10-2016-0099791.

Korean Office Action (with English translation) dated Aug. 18, 2016 in corresponding Korean application No. 10-2015-0087373(12 pages).

Korean Office Action (with English translation) dated Sep. 5, 2016 in corresponding Korean application No. 10-2016-0099791 (13 pages).

Korean Office Action (with English translation) dated Jun. 8, 2016 in corresponding Korean application No. 10-2015-0087373 (7 pages).

* cited by examiner

ELECTROLYTIC SOLUTION AND BATTERY

CROSS REFERENCES TO RELATED APPLICATIONS

The present invention contains subject matter related to Japanese Patent Application JP 2007-1134227 filed in the Japanese Patent Office on May 21, 2007, the entire contents of which being incorporated herein by reference.

BACKGROUND OF THE INVENTION

1. Field of the Invention

The present invention relates to an electrolytic solution including a solvent and an electrolyte salt and a battery using the electrolytic solution.

2. Description of the Related Art

In recent years, portable electronic devices such as camera-integrated VTRs (videotape recorders), cellular phones, or laptop computers are widely used, and size and weight reduction in the portable electronic devices and an increase in longevity of the portable electronic devices have been strongly demanded. Accordingly, as power sources for the portable electronic devices, the development of batteries, specifically lightweight secondary batteries capable of obtaining a high energy density have been promoted. Among them, a secondary battery (a so-called lithium-ion secondary battery) using insertion and extraction of lithium for charge-discharge reaction, a secondary battery (so-called lithium metal secondary battery) using precipitation and dissolution of lithium, or the like holds great promise, because the secondary batteries are capable of obtaining a large energy density, compared to a lead-acid battery or a nickel-cadmium battery.

As an electrolytic solution for the lithium-ion secondary battery and the lithium metal secondary battery, a combination of a carbonate-based solvent such as propylene carbonate or diethyl carbonate and an electrolyte salt such as lithium hexafluorophosphate is widely used. It is because the combination has high conductivity, and its potential is stable.

In addition, to improve various performance capabilities, some techniques relating to the compositions of electrolytic solutions used in these secondary batteries have already been proposed. More specifically, to improve cycle characteristics or safety, a technique of including a chain carbonate including a halogen is known (for example, refer to Japanese Patent No. 3294400). Moreover, to improve high-temperature storage characteristics, initial charge-discharge characteristics, safety characteristics, cycle characteristics or the like, techniques of including a chain carbonate dimer, a chain carboxylate dimer, a chain sulfonate dimer, or a phosphate are known (for example, refer to Japanese Patent No. 3393620, and Japanese Unexamined Patent Application Publication Nos. 2000-182669, 2001-085056, 2004-079426, 2007-005242, 2006-351337, 2006-004746 and 2006-004747). Further, to improve cycle characteristics, a technique of including a cyclic carbonate including a halogen and a chain carboxylate dimer is known (for example, refer to Japanese Unexamined Patent Application Publication No. 2006-172811).

SUMMARY OF THE INVENTION

Recently, electronic devices are distributed over a wide range of fields, so secondary batteries tend to be exposed to a high-temperature atmosphere during transport. Moreover, as the heating values of electronic devices increase because of factors such as enhancement of performance of electronic parts typified by CPUs (central processing units), the secondary batteries in use tend to be exposed to a high-temperature atmosphere. These high-temperature environments cause a decline in the battery characteristics of the secondary batteries, and in particular, the high-temperature environments easily cause a decline in discharge capacity when the secondary batteries are stored at high temperature, so further improvement in high-temperature characteristics of the secondary batteries is desired.

In view of the foregoing, it is desirable to provide an electrolytic solution capable of improving high-temperature characteristics, and a battery including the electrolytic solution.

According to an embodiment of the invention, there is provided an electrolytic solution including: a solvent; and an electrolyte salt, in which the solvent includes: at least one kind selected from the group consisting of a cyclic carbonate represented by Chemical Formula 1 which includes a halogen and a chain carbonate represented by Chemical Formula 2 which includes a halogen; and at least one kind selected from the group consisting of compounds represented by Chemical Formulas 3, 4 and 5.

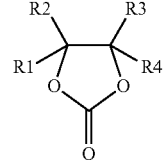

Chemical Formula 1 where R1, R2, R3 and R4 each represent a hydrogen group, a halogen group, an alkyl group or a halogenated alkyl group, and at least one of them is a halogen group or a halogenated alkyl group.

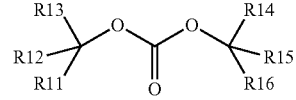

Chemical Formula 2 where R11, R12, R13, R14, R15 and R16 each represent a hydrogen group, a halogen group, an alkyl group or a halogenated alkyl group, and at least one of them is a halogen group or a halogenated alkyl group.

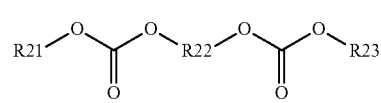

Chemical Formula 3 where R21 and R23 each represent an alkyl group, an alkenyl group, an alkynyl group, an aryl group, a heterocyclic group, or an alkyl group, an alkenyl group or an alkynyl group substituted with an aromatic hydrocarbon group or an alicyclic hydrocarbon group, or a group formed by halogenating any one of them, and R22 represents a straight-chain or branched alkylene group, an arylene group, a divalent group including an arylene group and an alkylene group, a divalent group with 2 to 12 carbon atoms which includes an ether bond and an alkylene group, or a group formed by halogenating any one of them.

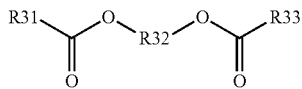

Chemical Formula 4 where R31 and R33 each represent an alkyl group, an alkenyl group, an alkynyl group, an aryl group, a heterocyclic group, or an alkyl group, an alkenyl group or an alkynyl group substituted with an aromatic hydrocarbon group or an alicyclic hydrocarbon group, or a group formed by halogenating any one of them, and R32 represents a straight-chain or branched alkylene group, an arylene group, a divalent group including an arylene group and an alkylene group, a divalent group with 2 to 12 carbon atoms which includes an ether bond and an alkylene group, or a group formed by halogenating any one of them.

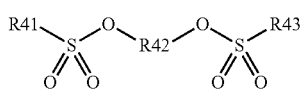

Chemical Formula 5 where R41 and R43 each represent an alkyl group, an alkenyl group, an alkynyl group, an aryl group, a heterocyclic group, or an alkyl group, an alkenyl group or an alkynyl group substituted with an aromatic hydrocarbon group or an alicyclic hydrocarbon group, or a group formed by halogenating any one of them, and R42 represents a straight-chain or branched alkylene group, an arylene group, a divalent group including an arylene group and an alkylene group, a divalent group with 2 to 12 carbon atoms which includes an ether bond and an alkylene group, or a group formed by halogenating any one of them.

According to an embodiment of the invention, there is provided a battery including a cathode, an anode and an electrolytic solution, in which the electrolytic solution includes a solvent and an electrolyte salt, and the solvent includes: at least one kind selected from the group consisting of a cyclic carbonate represented by Chemical Formula 6 which includes a halogen and a chain carbonate represented by Chemical Formula 7 which includes a halogen; and at least one kind selected from the group consisting of compounds represented by Chemical Formulas 8, 9 and 10.

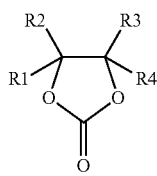

Chemical Formula 6 where R1, R2, R3 and R4 each represent a hydrogen group, a halogen group, an alkyl group or a halogenated alkyl group, and at least one of them is a halogen group or a halogenated alkyl group.

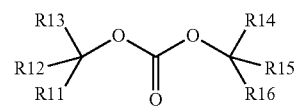

Chemical Formula 7 where R11, R12, R13, R14, R15 and R16 each represent a hydrogen group, a halogen group, an alkyl group or a halogenated alkyl group, and at least one of them is a halogen group or a halogenated alkyl group.

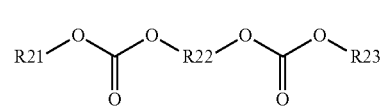

Chemical Formula 8 where R21 and R23 each represent an alkyl group, an alkenyl group, an alkynyl group, an aryl group, a heterocyclic group, or an alkyl group, an alkenyl group or an alkynyl group substituted with an aromatic hydrocarbon group or an alicyclic hydrocarbon group, or a group formed by halogenating any one of them, and R22 represents a straight-chain or branched alkylene group, an arylene group, a divalent group including an arylene group and an alkylene group, a divalent group with 2 to 12 carbon atoms which includes an ether bond and an alkylene group, or a group formed by halogenating any one of them.

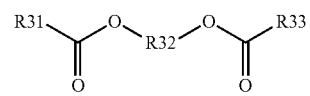

Chemical Formula 9 where R31 and R33 each represent an alkyl group, an alkenyl group, an alkynyl group, an aryl group, a heterocyclic group, or an alkyl group, an alkenyl group or an alkynyl group substituted with an aromatic hydrocarbon group or an alicyclic hydrocarbon group, or a group formed by halogenating any one of them, and R32 represents a straight-chain or branched alkylene group, an arylene group, a divalent group including an arylene group and an alkylene group, a divalent group with 2 to 12 carbon atoms which includes an ether bond and an alkylene group, or a group formed by halogenating any one of them.

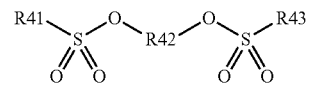

Chemical Formula 10 where R41 and R43 each represent an alkyl group, an alkenyl group, an alkynyl group, an aryl group, a heterocyclic group, or an alkyl group, an alkenyl group or an alkynyl group substituted with an aromatic hydrocarbon group or an alicyclic hydrocarbon group, or a group formed by halogenating any one of them, and R42 represents a straight-chain or branched alkylene group, an arylene group, a divalent group including an arylene group and an alkylene group, a divalent group with 2 to 12 carbon atoms which includes an ether bond and an alkylene group, or a group formed by halogenating any one of them.

In the electrolytic solution according to the embodiment of the invention, the solvent includes at least one kind selected from the group consisting of a cyclic carbonate represented by Chemical Formula 1 which includes a halogen and a chain carbonate represented by Chemical Formula 2 which includes a halogen, and at least one kind selected from the group consisting of compounds represented by Chemical Formulas 3, 4 and 5, so chemical stability is improved. Thereby, in a battery including the electrolytic solution according to the embodiment of the invention, the decomposition of the electrolytic solution is prevented, so high-temperature characteristics such as storage characteristics may be improved.

Other and further objects, features and advantages of the invention will appear more fully from the following description.

DETAILED DESCRIPTION OF THE PREFERRED EMBODIMENTS

Figure 1:
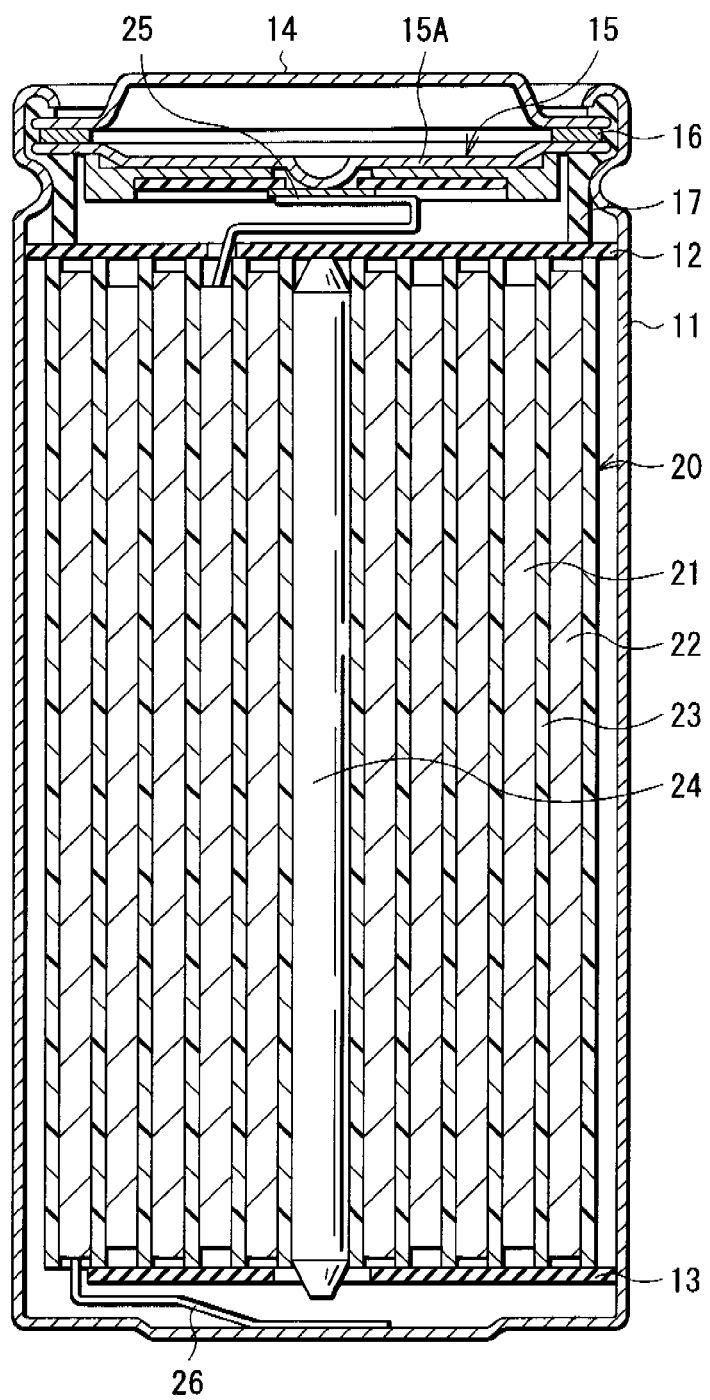
FIG. 1 is a sectional view showing the configuration of a first battery using an electrolytic solution according to an embodiment of the invention.

A preferred embodiment will be described in detail below referring to the accompanying drawings.

An electrolytic solution according to an embodiment of the invention is used in, for example, an electrochemical device such as a battery, and includes a solvent and an electrolyte salt.

The solvent includes a main solvent and a sub solvent. The main solvent includes at least one kind selected from the group consisting of a cyclic carbonate represented by Chemical Formula 11 which includes a halogen as an element and a chain carbonate represented by Chemical Formula 12 which includes a halogen as an element. The sub solvent includes at least one kind selected from the group consisting of compounds represented by Chemical Formulas 13, 14 and 15. It is because when the solvent includes the main solvent and the sub solvent together, the chemical stability of the electrolytic solution is improved.

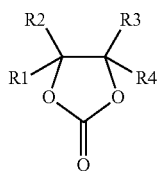

Chemical Formula 11 where $R1$, $R2$, $R3$ and $R4$ each represent a hydrogen group, a halogen group, an alkyl group or a halogenated alkyl group, and at least one of them is a halogen group or a halogenated alkyl group.

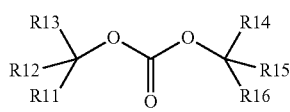

Chemical Formula 12 where $R11$, $R12$, $R13$, $R14$, $R15$ and $R16$ each represent a hydrogen group, a halogen group, an alkyl group or a halogenated alkyl group, and at least one of them is a halogen group or a halogenated alkyl group.

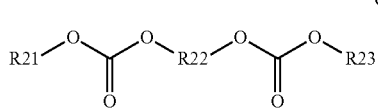

Chemical Formula 13 where $R21$ and $R23$ each represent an alkyl group, an alkenyl group, an alkynyl group, an aryl group, a heterocyclic group, or an alkyl group, an alkenyl group or an alkynyl group substituted with an aromatic hydrocarbon group or an alicyclic hydrocarbon group, or a group formed by halogenating any one of them, and $R22$ represents a straight-chain or branched alkylene group, an arylene group, a divalent group including an arylene group and an alkylene group, a divalent group with 2 to 12 carbon atoms which includes an ether bond and an alkylene group, or a group formed by halogenating any one of them.

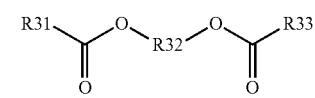

Chemical Formula 14 where $R31$ and $R33$ each represent an alkyl group, an alkenyl group, an alkynyl group, an aryl group, a heterocyclic group, or an alkyl group, an alkenyl group or an alkynyl group substituted with an aromatic hydrocarbon group or an alicyclic hydrocarbon group, or a group formed by halogenating any one of them, and $R32$ represents a straight-chain or branched alkylene group, an arylene group, a divalent group including an arylene group and an alkylene group, a divalent group with 2 to 12 carbon atoms which includes an ether bond and an alkylene group, or a group formed by halogenating any one of them.

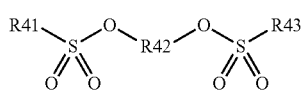

Chemical Formula 15 where $R41$ and $R43$ each represent an alkyl group, an alkenyl group, an alkynyl group, an aryl group, a heterocyclic group, or an alkyl group, an alkenyl group or an alkynyl group substituted with an aromatic hydrocarbon group or an alicyclic hydrocarbon group, or a group formed by halogenating any one of them, and $R42$ represents a straight-chain or branched alkylene group, an arylene group, a divalent group including an arylene group and an alkylene group, a divalent group with 2 to 12 carbon atoms which includes an ether bond and an alkylene group, or a group formed by halogenating any one of them.

In addition, R1 to R4 in Chemical Formula 11 may be the same as or different from one another. The same holds for R11 to R16 in Chemical Formula 12. Moreover, R21 and R23 in Chemical Formula 13 may be the same as or different from each other. The same holds for R31 and R33 in Chemical Formula 14, and R41 and R43 in Chemical Formula 15. The "group formed by halogenating any one of them" described in Chemical Formulas 13 to 15 means a group formed by substituting a halogen group for at least a part of a hydrogen group, and the same holds for Chemical Formula 26 which will be described later.

Specific compositions of the cyclic carbonate represented by Chemical Formula 11 which includes a halogen, the chain carbonate represented by Chemical Formula 12 which includes a halogen, the compounds represented by Chemical Formulas 13, 14 and 15 will be described in detail below.

In the case where the electrolytic solution is used for an electrochemical device, the cyclic carbonate represented by Chemical Formula 11 which includes a halogen and the chain carbonate represented by Chemical Formula 12 which includes a halogen forms a film (a halide) on a surface of an electrode so as to improve the chemical stability of the electrolytic solution. The number of halogens is preferably two or more. It is because a strong and stable film is formed, compared to the case where the number of halogens is 1, so a higher effect may be obtained.

In the case where at least one of R1 to R4 represented by Chemical Formula 11 is an alkyl group or a halogenated alkyl group, as R1 to R4, a methyl group, an ethyl group, a halogenated methyl group, a halogenated ethyl group or the like is preferable, because a sufficient effect may be obtained.

Examples of the cyclic carbonate represented by Chemical Formula 11 which includes a halogen include compounds represented by Chemical Formulas 16 and 17. More specifically, 4-fluoro-1,3-dioxolane-2-one in Chemical Formula 16(1), 4-chloro-1,3-dioxolane-2-one in Chemical Formula 16(2), 4,5-difluoro-1,3-dioxolane-2-one in Chemical Formula 16(3), tetrafluoro-1,3-dioxolane-2-one in Chemical Formula 16(4), 4-fluoro-5-chloro-1,3-dioxolane-2-one in Chemical Formula 16(5), 4,5-dichloro-1,3-dioxolane-2-one in Chemical Formula 16(6), tetrachloro-1,3-dioxolane-2-one in Chemical Formula 16(7), 4,5-bistrifluoromethyl-1,3-dioxolane-2-one in Chemical Formula 16(8), 4-trifluoromethyl-1,3-dioxolane-2-one in Chemical Formula 16(9), 4,5-difluoro-4,5-dimethyl-1,3-dioxolane-2-one in Chemical Formula 16(10), 4-methyl-5,5-difluoro-1,3-dioxolane-2-one in Chemical Formula 16(11), 4-ethyl-5,5-difluoro-1,3-dioxolane-2-one in Chemical Formula 16(12) and the like are cited. Moreover, 4-trifluoromethyl-5-fluoro-1,3-dioxolane-2-one in Chemical Formula 17(1), 4-trifluoromethyl-5-methyl-1,3-dioxolane-2-one in Chemical Formula 17(2), 4-fluoro-4,5-dimethyl-1,3-dioxolane-2-one in Chemical Formula 17(3), 4,4-difluoro-5-(1,1-difluoroethyl)-1,3-dioxolane-2-one in Chemical Formula 17(4), 4,5-dichloro-4,5-dimethyl-1,3-dioxolane-2-one in Chemical Formula 17(5), 4-ethyl-5-fluoro-1,3-dioxolane-2-one in Chemical Formula 17(6), 4-ethyl-4,5-difluoro-1,3-dioxolane-2-one in Chemical Formula 17(7), 4-ethyl-4,5,5-trifluoro-1,3-dioxolane-2-one in Chemical Formula 17(8), 4-fluoro-4-trifluoromethyl-1,3-dioxolane-2-one in Chemical Formula 17(9), 4,5-bistrifluoromethyl-4,5-difluoro-1,3-dioxolane-2-one in Chemical Formula 17(10), 4-bromo-1,3-dioxolane-2-one in Chemical Formula 17(11) and the like are cited. Only one kind or a mixture of a plurality of kinds selected from them may be used. Among them, at least one kind selected from 4-fluoro-1,3-dioxolane-2-one and 4,5-difluoro-1,3-dioxolane-2-one is preferable, and 4,5-difluoro-1,3-dioxolane-2-one is more preferable. It is because they are easily available, and a higher effect may be obtained. In particular, as 4,5-difluoro-1,3-dioxolane-2-one, a trans-isomer is more preferable than a cis-isomer. As long as the cyclic carbonate has the composition represented by Chemical Formula 11, the cyclic carbonate is not limited to the above-described compounds.

Chemical Formula 16

(1)
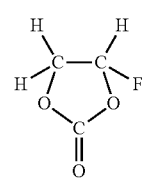

(2)
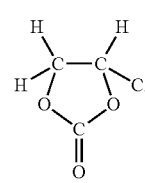

(3)
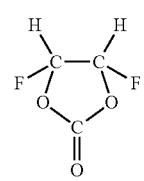

(4)
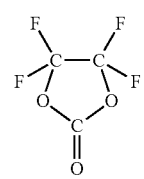

(5)
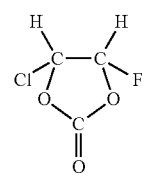

(6)
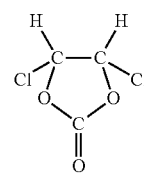

(7)
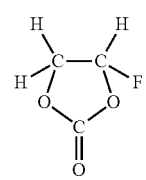

-continued
(8)
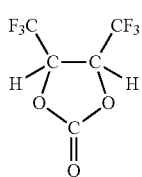
(9)
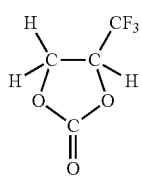
(10)
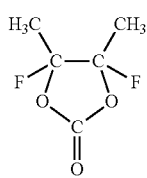
(11)
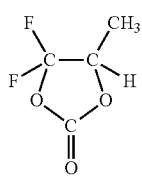
(12)
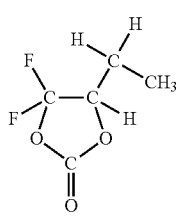
Chemical Formula 17
(1)
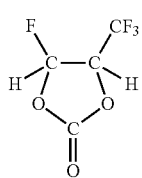
(2)
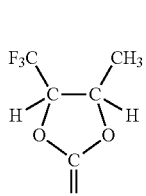
(3)
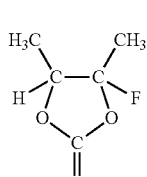
-continued
(4)
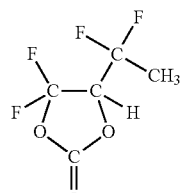
(5)
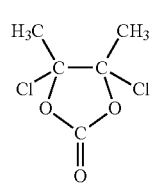
(6)
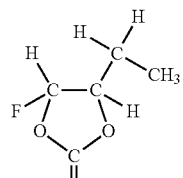
(7)
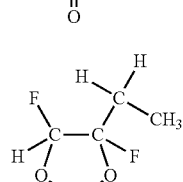
(8)
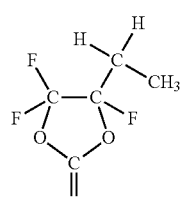
(9)
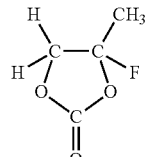
(10)
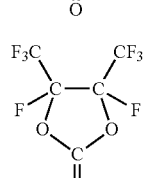
(11)
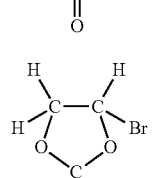
Examples of the chain carbonate represented by Chemical Formula 12 which include a halogen include bis(fluoromethyl)carbonate, fluromethyl methyl carbonate, difluoromethyl methyl carbonate and the like. Only one kind or a mixture of a plurality of kinds selected from them may be used. Among them, bis(fluoromethyl)carbonate is preferable, because a sufficient effect may be obtained. As long as the chain carbonate has the composition represented by Chemical Formula 12, the chain carbonate is not limited to the above-described compounds.

The content of the compounds represented by Chemical Formulas 13 to 15 as the sub solvents is preferably within a range from 0.001 wt % to 10 wt % both inclusive, because a sufficient effect may be obtained. More specifically, the content is more preferably within a range from 0.01 wt % to 1 wt % both inclusive, and particularly preferably within a range from 0.1 wt % to 1 wt % both inclusive, because a higher effect may be obtained.

The molecular weight of the compound represented by Chemical Formula 13 is preferably within a range from 200 to 800 both inclusive, more preferably within a range from 200 to 600 both inclusive, and particularly preferably within a range from 200 to 450 both inclusive. It is because a sufficient effect may be obtained, and sufficient solubility and sufficient compatibility may be obtained.

Examples of R21 and R23 represented by Chemical Formula 13 include the following groups.

As the alkyl group, a methyl group, an ethyl group, an n (normal)-propyl group, an isopropyl group, an n-butyl group, an isobutyl group, a sec (secondary)-butyl group, a tert (tertiary)-butyl group, an n-pentyl group, a 2-methylbutyl group, a 3-methylbutyl group, a 2,2-dimethyl propyl group, an n-hexyl group or the like is cited. As the alkenyl group, an n-heptyl group, a vinyl group, a 2-methylvinyl group, a 2,2-dimethyl vinyl group, a butane-2,4-diyl group, an allyl group or the like is cited. As the alkynyl group, an ethynyl group or the like is cited. The number of carbon atoms in the alkyl group, the alkenyl group or the alkynyl group is preferably within a range from 1 to 20 both inclusive, more preferably within a range from 1 to 7 both inclusive, and particularly preferably within a range from 1 to 4 both inclusive. It is because a sufficient effect may be obtained, and sufficient compatibility may be obtained.

In the case where the alkyl group, the alkenyl group or the alkynyl group is substituted with an aromatic hydrocarbon group or an alicyclic hydrocarbon group, as the aromatic hydrocarbon group, a phenyl group or the like is cited, and as the alicyclic hydrocarbon group, a cyclohexyl group or the like is cited. Among them, as an alkyl group substituted with a phenyl group (a so-called aralkyl group), for example, a benzyl group, a 2-phenyl ethyl group (a phenethyl group) or the like is cited.

As an alkyl group substituted with a halogen (a halogenated alkyl group), a fluorinated alkyl group is cited. As the fluorinated alkyl group, a fluoromethyl group, a difluoromethyl group, a trifluoromethyl group, a 2,2,2-trifluoroethyl group, a pentafluoroethyl group or the like is cited.

Among them, an alkyl group or the like substituted with an aromatic hydrocarbon group or an alicyclic hydrocarbon group is more preferable than an alkyl group or the like substituted with a halogen, and an alkyl group or the like not substituted with an aromatic hydrocarbon group or an alicyclic hydrocarbon group is more preferable. In the alkyl group or the like substituted with an aromatic hydrocarbon group or an alicyclic hydrocarbon group, the total of the number of carbon atoms in the aromatic hydrocarbon group or the alicyclic hydrocarbon group and the number of carbon atoms in the alkyl group or the like is preferably 20 or less, and more preferably 7 or less.

In the case where R22 in Chemical Formula 13 is a straight-chain or branched alkylene group, an arylene group or a divalent group including an arylene group and an alkylene group, the numbers of carbon atoms in these group is freely settable; however, the numbers of carbon atoms in these group are preferably within a range from 2 to 10 both inclusive, and more preferably within a range from 2 to 6 both inclusive, and particularly preferably within a range from 2 to 4 both inclusive. It is because a sufficient effect may be obtained, and sufficient compatibility may be obtained. The divalent group including an arylene group and an alkylene group may be a divalent group in which one arylene group and one alkylene group are linked, or a divalet group (an aralkylene group) in which two alkylene groups are linked through an arylene group.

As R22 in this case, for example, straight-chain alkylene groups represented by Chemical Formulas 18(1) to 18(7), branched alkylene groups represented by Chemical Formulas 19(1) to 19(9), arylene groups represented by Chemical Formulas 20(1) to 20(3), divalent groups including an arylene group and an alkylene group represented by Chemical Formulas 20(4) to 20(6) and the like are cited. The divalent groups in Chemical Formulas 20(4) to 20(6) are so-called benzylidene groups.

Chemical Formula 18

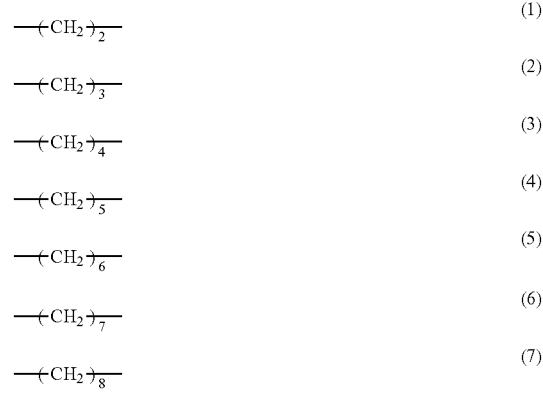

Chemical Formula 19

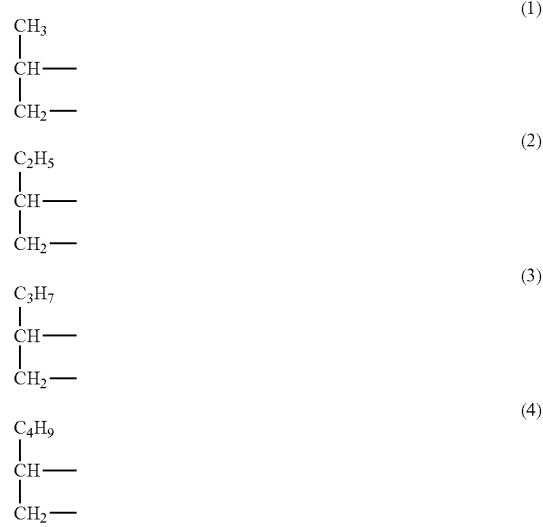

-continued (5)
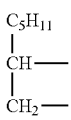

(6)
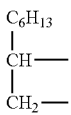

(7)
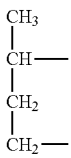

(8)
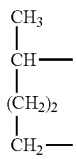

(9)
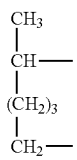

Chemical Formula 20

(1)
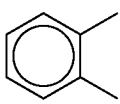

(2)
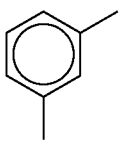

(3)
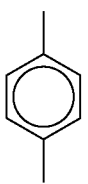

(4)
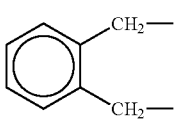

(5)
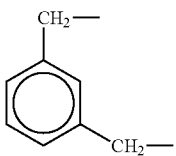

(5)
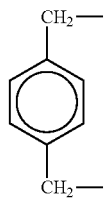

Moreover, in the case where R22 is a divalent group with 2 to 12 carbon atoms which includes an ether bond and an alkylene group, a group in which at least two alkylene groups are linked through an ether bond, and carbon atoms are located at ends of the group is preferable. The number of carbon atoms in this case is preferably within a range from 4 to 12 both inclusive. It is because a sufficient effect may be obtained, and sufficient compatibility may be obtained. In addition, in a divalent group with 2 to 12 carbon atoms which includes an ether bond and an alkylene group, the number of ether bonds and the order in which an ether bond and an alkylene group are linked are freely settable.

As R22 in this case, for example, divalent groups represented by Chemical Formulas 21(1) to 21(13) and the like are cited. In the case where the divalent groups in the Chemical Formula 21 are fluorinated, as R22, for example, divalent groups represented by Chemical Formulas 22(1) to 22(9) and the like are cited. Among them, divalent groups represented by Chemical Formulas (21)(6) to (8) are preferable.

Chemical Formula 21

$$—CH_2—O—CH_2— \quad (1)$$

$$—CH_2\!-\!\!(\!O—CH_2\!)_{\!2}\!— \quad (2)$$

$$—CH_2\!-\!\!(\!O—CH_2\!)_{\!3}\!— \quad (3)$$

$$—CH_2\!-\!\!(\!O—CH_2\!)_{\!4}\!— \quad (4)$$

$$—CH_2\!-\!\!(\!O—CH_2\!)_{\!5}\!— \quad (5)$$

$$—CH_2—CH_2—O—CH_2—CH_2— \quad (6)$$

$$—CH_2—CH_2\!-\!\!(\!O—CH_2—CH_2\!)_{\!2}\!— \quad (7)$$

$$—CH_2—CH_2\!-\!\!(\!O—CH_2—CH_2\!)_{\!3}\!— \quad (8)$$

$$—CH_2—CH_2\!-\!\!(\!O—CH_2—CH_2\!)_{\!4}\!— \quad (9)$$

$$—CH_2—CH_2\!-\!\!(\!O—CH_2—CH_2\!)_{\!5}\!— \quad (10)$$

$$—CH_2—CH_2—CH_2—O—CH_2—CH_2—CH_2— \quad (11)$$

$$—CH_2—CH_2—CH_2\!-\!\!(\!O—CH_2—CH_2—CH_2\!)_{\!2}\!— \quad (12)$$

$$—CH_2—CH_2—CH_2\!-\!\!(\!O—CH_2—CH_2—CH_2\!)_{\!3}\!— \quad (13)$$

Chemical Formula 22

$$—CF_2—O—CF_2— \quad (1)$$

$$—CF_2\!-\!\!(\!O—CF_2\!)_{\!2}\!— \quad (2)$$

-continued

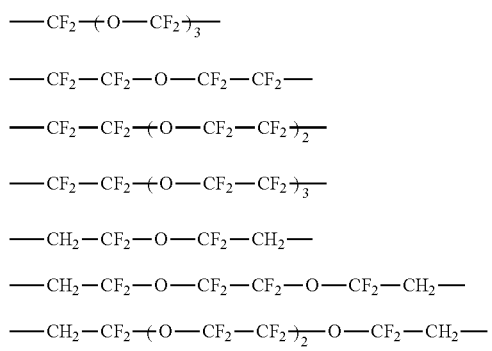

As a specific example of the compound represented by Chemical Formula 13, a compound represented by Chemical Formula 23 or the like is cited, because a sufficient effect may be obtained. As long as the compound has a composition represented by Chemical Formula 13, the compound is not limited to the compound represented by Chemical Formula 23.

Chemical Formula 23

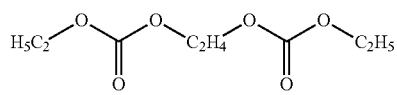

The molecular weight of the compound represented by Chemical Formula 14 is preferably within a range from 162 to 1000 both inclusive, and more preferably within a range from 162 to 500 both inclusive, and particularly preferably within a range from 162 to 300 both inclusive. It is because a sufficient effect may be obtained, and sufficient compatibility may be obtained. Specific examples of R31 and R33 represented by Chemical Formula 14 are the same as the above-described examples of R21 and R23 represented by Chemical formula 13. Moreover, specific examples of R32 represented by Chemical Formula 14 are the same as the above-described examples of R22 represented by Chemical Formula 13. As a specific example of the compound represented by Chemical Formula 14, a compound represented by Chemical Formula 24 or the like is cited, because a sufficient effect may be obtained. In addition to this, diethylene glycol dipropionate, diethylene glycol dibutyrate, triethylene glycol diacetate, triethylene glycol dipropionate, triethylene glycol dibutyrate, tetraethylene glycol diacetate, tetraethylene glycol dipropionate, tetraethylene glycol dibutyrate or the like is cited. As long as the compound has a composition represented by Chemical Formula 14, the compound is not limited to the above-described compounds.

Chemical Formula 24

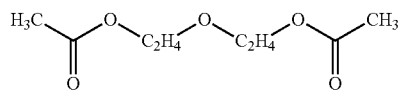

The molecular weight of the compound represented by Chemical Formula 15 is preferably within a range from 200 to 800 both inclusive, more preferably within a range from 200 to 600 both inclusive, and particularly preferably within a range from 200 to 450 both inclusive. It is because a sufficient effect may be obtained, and sufficient solubility and sufficient compatibility may be obtained. Specific examples of R41 and R43 represented by Chemical Formula 15 are the same as the above-described specific examples of R21 and R23 represented by Chemical Formula 13. Moreover, specific examples of R42 represented by Chemical Formula 15 are the same as the above-described specific examples of R22 represented by Chemical Formula 13. As a specific example of the compound represented by Chemical Formula 15, a compound represented by Chemical Formula 25 or the like is cited. It is because a sufficient effect may be obtained. As long as the compound has a composition represented by Chemical Formula 15, the compound is not limited to the compound represented by Chemical Formula 25.

Chemical Formula 25

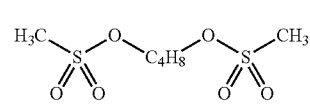

Moreover, the main solvent may include a nonaqueous solvent such as other organic solvent in addition to at least one kind selected from the group consisting of the cyclic carbonate represented by Chemical Formula 11 which includes a halogen and the chain carbonate represented by Chemical Formula 12 which includes a halogen. Examples of the nonaqueous solvent include ethylene carbonate, propylene carbonate, butylene carbonate, dimethyl carbonate, diethyl carbonate, ethyl methyl carbonate, methyl propyl carbonate, γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, methyl trimethylacetate, ethyl trimethylacetate, acetonitrile, glutaronitrile, adiponitrile, methoxyacetonitrile, 3-methoxypropionitrile, N,N-dimethylformamide, N-methylpyrrolidinone, N-methyloxazolidinone, N,N'-dimethyl imidazolidinone, nitromethane, nitroethane, sulfolane, trimethyl phosphate, dimethyl sulfoxide, dimethyl sulfoxide phosphate and the like. Only one kind or a mixture of a plurality of kinds selected from them may be used. Among them, the main solvent preferably includes at least one kind selected from the group consisting of ethylene carbonate, propylene carbonate, dimethyl carbonate, diethyl carbonate and ethyl methyl carbonate, because a sufficient effect may be obtained. In this case, in particular, the main solvent preferably includes a mixture of a high-viscosity (high-permittivity) solvent (for example, relative permittivity ε≥30) such as ethylene carbonate or propylene carbonate and a low-viscosity solvent (for example, viscosity≤1 mPa·s) such as dimethyl carbonate, ethyl methyl carbonate or diethyl carbonate. It is because the dissociation property of the electrolyte salt and ion mobility are improved, so a higher effect may be obtained.

The solvent may further include an auxiliary solvent. The auxiliary solvent preferably includes a compound represented by Chemical Formula 26. It is because the chemical stability of the electrolytic solution is further improved. The content of the auxiliary solvent in the solvent is preferably within a range from 0.001 wt % to 1 wt % both inclusive, because a sufficient effect may be obtained.

Chemical Formula 26

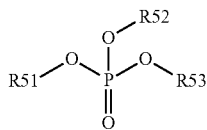

where R51, R52 and R53 each represent an alkyl group, an alkenyl group, an alkynyl group, an aryl group, a heterocyclic group, or an alkyl group, an alkenyl group or alkynyl group substituted with an aromatic hydrocarbon group or alicyclic hydrocarbon group, or a group formed by halogenating any one of them.

The molecular weight of the compound represented by Chemical Formula 26 is preferably within a range from 200 to 800 both inclusive, more preferably within a range from 200 to 600 both inclusive, and particularly preferably within a range from 200 to 450 both inclusive. It is because a sufficient effect may be obtained, and sufficient compatibility may be obtained. Specific examples of R51, R52 and R53 represented by Chemical Formula 26 are the same as the specific examples of R21 and R23 represented by Chemical Formula 13.

As a specific example of the compound represented by Chemical Formula 26, a compound represented by Chemical Formula 27 or the like is cited. As long as the compound has a composition represented by Chemical Formula 26, the compound is not limited to the compound represented by Chemical Formula 27.

Chemical Formula 27

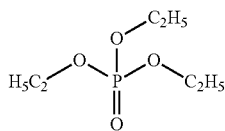

Moreover, the solvent preferably includes a cyclic carbonate including an unsaturated bond as another solvent, because the chemical stability of the electrolytic solution is further improved. The content of the cyclic carbonate including an unsaturated bond in the solvent is preferably within a range from 0.01 wt % to 5 wt % both inclusive, because a sufficient effect may be obtained. As the cyclic carbonate including an unsaturated bond, for example, at least one kind selected from the group consisting of a vinylene carbonate-based compound, a vinyl ethylene carbonate-based compound and a methylene ethylene carbonate-based compound, or the like is cited.

Examples of the vinylene carbonate-based compound include vinylene carbonate (1,3-dioxol-2-one), methyl vinylene carbonate (4-methyl-1,3-dioxol-2-one), ethyl vinylene carbonate (4-ethyl-1,3-dioxol-2-one), 4,5-dimethyl-1,3-dioxol-2-one, 4,5-diethyl-1,3-dioxol-2-one, 4-fluoro-1,3-dioxol-2-one, 4-trifluoromethyl-1,3-dioxol-2-one and the like.

Examples of the vinyl ethylene carbonate-based compound include vinyl ethylene carbonate (4-vinyl-1,3-dioxolane-2-one), 4-methyl-4-vinyl-1,3-dioxolane-2-one, 4-ethyl-4-vinyl-1,3-dioxolane-2-one, 4-n-propyl-4-vinyl-1,3-dioxolane-2-one, 5-methyl-4-vinyl-1,3-dioxolane-2-one, 4,4-divinyl-1,3-dioxolane-2-one, 4,5-divinyl-1,3-dioxolane-2-one and the like.

Examples of the methylene ethylene carbonate-based compound include 4-methylene-1,3-dioxolane-2-one, 4,4-dimethyl-5-methylene-1,3-dioxolane-2-one, 4,4-diethyl-5-methylene-1,3-dioxolane-2-one and the like.

Only one kind or a mixture of a plurality of kinds selected from them may be used. Among them, as the cyclic carbonate including an unsaturated bond, vinylene carbonate is preferable, because a sufficient effect may be obtained.

Further, the solvent preferably includes a sultone (a cyclic sulfonate) or an acid anhydride, because the chemical stability of the electrolytic solution is further improved. The content of the sultone in the solvent is preferably within a range from 0.5 wt % to 3 wt % both inclusive, because a sufficient effect may be obtained. Examples of the sultone include propane sultone, propene sultone and the like. Only one kind or a mixture of a plurality of kinds selected from them may be used. Among them, propene sultone is preferable, because a sufficient effect may be obtained.

The content of the acid anhydride in the solvent is preferably within a range from 0.5 wt % to 3 wt % both inclusive, because a sufficient effect may be obtained. Examples of the acid anhydride include a carboxylic anhydride such as succinic anhydride, glutaric anhydride or maleic anhydride, a disulfonic anhydride such as ethanedisulfonic anhydride or propanedisulfonic anhydride or an anhydride of a carboxylic acid and a sulfonic acid such as sulfobenzoic anhydride, sulfopropionic anhydride or sulfobutyric anhydride. Only one kind or a mixture of a plurality of kinds selected from them may be used. Among them, the solvent more preferably includes succinic anhydride or sulfobenzoic anhydride, because a sufficient effect may be obtained.

For example, the intrinsic viscosity of the solvent is preferably 10.0 mPa·s or less at 25° C. It is because the dissociation property of the electrolyte salt and ion mobility may be secured. The intrinsic viscosity in a state in which the electrolyte salt is dissolved in the sovent (that is, the intrinsic viscosity of the electrolytic solution) is also preferably 10.0 mPa·s or less at 25° C. because of the same reason.

The electrolyte salt includes one kind or two or more kinds of light metal salts such as a lithium salt. Examples of the lithium salt include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenyl borate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), lithium hexafluorosilicate ($Li_2SiF_6$), lithium chloride (LiCl), lithium bromide (LiBr) and the like. Only one kind or a mixture of a plurality of kinds selected from them may be used. Among them, at least one kind selected from the group consisting of lithium hexafluorophosphate, lithium tetrafluoroborate, lithium perchlorate and lithium hexafluoroarsenate is preferable, and in particular, lithium hexafluorophosphate is more preferable, because the resistance of the electrolytic solution declines, so sufficient chemical stability may be obtained. Moreover, a combination of lithium hexafluorophosphate and lithium tetrafluoroborate is preferable, because the chemical stability of the electrolytic solution is further improved.

Moreover, the electrolyte salt preferably includes a compound represented by Chemical Formula 28, because a higher effect may be obtained. As the compound represented by Chemical Formula 28, for example, a compound represented by Chemical Formula 29 is cited.

Chemical Formula 28

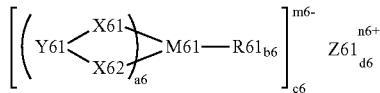

where Z61 represents a Group 1A element or a Group 2A element in the short form of the periodic table of the elements, or aluminum, M61 represents phosphorus or boron, R61 represents a halogen group, an alkyl group, a halogenated alkyl group, a aryl group or a halogenated aryl group, X61 and X62 each represent oxygen or sulfur, Y61 represents —OC—R62-CO—, —OC—C(R63)(R64)- or —OC—CO—, in which R62 represents an alkylene group, a halogenated alkylene group, an arylene group or a halogenated arylene group, R63 and R64 each represent an alkyl group, a halogenated alkyl group, an aryl group or a halogenated aryl group, and a6 is an integer of 1 to 4, b6 is an integer of 0 to 8, and c6, d6, m6 and n6 each are an integer of 1 to 3.

Chemical Formula 29

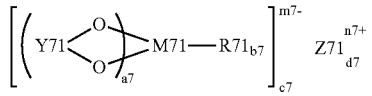

where Z71 represents a Group 1A element or a Group 2A element in the short form of the periodic table of the elements, or aluminum, M71 represents phosphorus or boron, R71 represents a halogen group, Y71 represents —OC—R72-CO—, —OC—C(R73)(R74)- or —OC—CO—, in which R72 represents an alkylene group, a halogenated alkylene group, an arylene group or a halogenated arylene group, and R73 and R74 each represent an alkyl group, a halogenated alkyl group, an aryl group or a halogenated aryl group, and a7 is an integer of 1 to 4, b7 is an integer of 0, 2 or 4, and c7, d7, m7 and n7 each are an integer of 1 to 3.

In addition, X61 and X62 represented by Chemical Formula 28 may be the same as or different from each other. The same holds for R62 and R63 represented by Chemical Formula 28 and R73 and R74 represented by Chemical Formula 29.

Specific examples of the compound represented by Chemical Formula 29 include compounds represented by Chemical Formulas 30(1) to 30(6). Only one kind or a mixture of a plurality of kinds selected from them may be used. Among them, the compound represented by Chemical Formula 30(6) is preferable. It is because in the case where the compound represented by Chemical Formula 30(6) is used together with the above-described lithium hexafluorophosphate, a higher effect may be obtained. As long as the compound has a composition represented by Chemical Formula 29, the compound is not limited to the compounds represented by Chemical Formula 30, and as long as the compound has a composition represented by Chemical Formula 28, the compound is not limited to the compounds represented by Chemical Formulas 29 and 30.

Chemical Formula 30

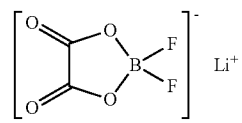
(1)

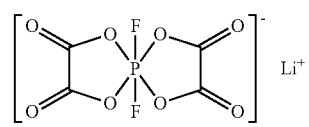
(2)

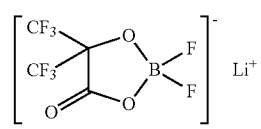
(3)

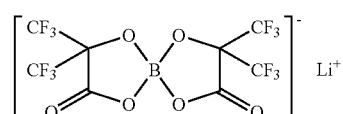
(4)

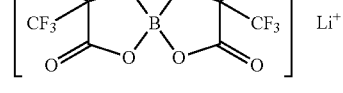
(5)

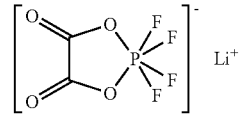
(6)

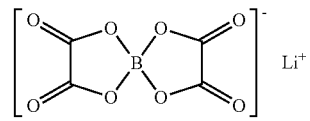

Moreover, the electrolyte salt preferably includes at least one kind selected from the group consisting of compounds represented by Chemical Formulas 31, 32 and 33. It is because in the case where at least one kind selected from them is used together with the above-described lithium hexafluorophosphate, a higher effect may be obtained. In addition, m and n represented by Chemical Formula 31 may be the same as or different from each other. The same holds for p, q and r represented by Chemical Formula 33.

$\text{LiN}(C_mF_{2m+1}SO_2)(C_nF_{2n+1}SO_2)$  Chemical Formula 31 where m and n each are an integer of 1 or more.

Chemical Formula 32

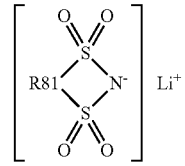

where R81 represents a straight-chain or branched perfluoroalkylene group having 2 to 4 carbon atoms.

$\text{LiC}(C_pF_{2p+1}SO_2)(C_qF_{2q+1}SO_2)(C_rF_{2r+1}SO_2)$  Chemical Formula 33 where p, q and r each are an integer of 1 or more.

Specific examples of the chain compound represented by Chemical Formula 31 include lithium bis(trifluoromethanesulfonyl)imide ($\text{LiN}(CF_3SO_2)_2$), lithium bis(pentafluoroethanesulfonyl)imide ($\text{LiN}(C_2F_5SO_2)_2$), lithium (trifluoromethanesulfonyl)(pentafluoroethanesulfonyl)imide ($\text{LiN}(CF_3SO_2)(C_2F_5SO_2)$), lithium (trifluoromethanesulfonyl)

(heptafluoropropanesulfonyl)imide (LiN(CF$_3$SO$_2$)(C$_3$F$_7$SO$_2$)), lithium (trifluoromethanesulfonyl)(nonafluorobutanesulfonyl)imide (LiN(CF$_3$SO$_2$)(C$_4$F$_9$SO$_2$)) and the like. Only one kind or a mixture of a plurality of kinds selected from them may be used.

Specific examples of the cyclic compound represented by Chemical Formula 32 include compounds represented by Chemical Formula 34. More specifically, lithium 1,2-perfluoroethanedisulfonylimide in Chemical Formula 34(1), lithium 1,3-perfluoropropanedisulfonylimide in Chemical Formula 34(2), lithium 1,3-perfluorobutanedisulfonylimide in Chemical Formula 34(3), lithium 1,4-perfluorobutanedisulfonylimide in Chemical Formula 34(4) and the like are cited. Only one kind or a mixture of a plurality of kinds selected from them may be used. Among them, lithium 1,3-perfluoropropanedisulfonylimide is preferable, because a sufficient effect may be obtained.

Chemical Formula 34

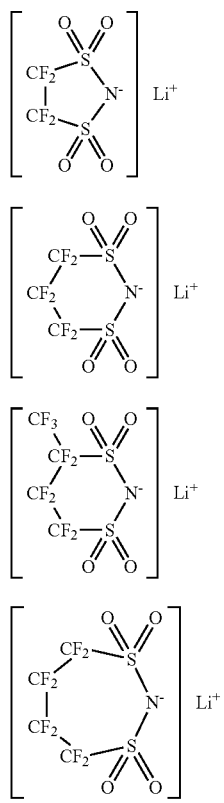

As a specific example of the chain compound represented by Chemical Formula 33, lithium tris(trifluoromethanesulfonyl)methide (LiC(CF$_3$SO$_2$)$_3$) or the like is cited.

The content of the electrolyte salt is preferably within a range from 0.3 mol/kg to 3.0 mol/kg both inclusive relative to the solvent. When the content of the electrolyte salt is out of the range, ionic conductivity is extremely reduced, so it may be difficult to obtain sufficient capacity characteristics or the like in the electrochemical device including the electrolytic solution.

In the electrolytic solution, the solvent includes at least one kind selected from the group consisting of the cyclic carbonate represented by Chemical Formula 11 which includes a halogen and the chain carbonate represented by Chemical Formula 12 which includes a halogen as the main solvent, and at least one kind selected from the group consisting of the compounds represented by Chemical Formulas 13, 14 and 15 as the sub solvent, so compared to the case where the electrolytic solution does not include both of the main solvent and the sub solvent, chemical stability is improved. Thereby, in the case where the electrolytic solution is used in an electrochemical device such as a battery, the electrolytic solution is able to contribute to improvement in high-temperature characteristics such as storage characteristics. In this case, when the content of the sub solvent (the compounds represented by Chemical Formulas 13, 14 and 16) in the solvent is within a range from 0.001 wt % to 10 wt % both inclusive, a sufficient effect may be obtained, and when the content is within a range from 0.001 wt % to 1 wt %, more specifically within a range from 0.1 wt % to 1 wt %, a higher effect may be obtained.

In particular, when the solvent includes the compound represented by Chemical Formula 26, a higher effect may be obtained.

Moreover, when the solvent includes the cyclic carbonate including an unsaturated bond, a sultone or an acid anhydride, a higher effect may be obtained.

Further, when the electrolyte salt includes lithium hexafluorophosphate, lithium tetrafluoroborate, lithium perchlorate or lithium hexafluoroarsenate, the compound represented by Chemical Formula 28, or at least one kind selected from the group consisting of the compounds represented by Chemical Formulas 31, 32 and 33, a higher effect may be obtained.

Next, application examples of the above-described electrolytic solution will be described below. As an example of the electrochemical device, a battery is cited, and the electrolytic solution is used in a battery as below.

(First Battery)

FIG. 1 shows a sectional view of a first battery. In this battery, the capacity of an anode is represented by a capacity component based on insertion and extraction of lithium as an electrode reactant, and the battery is a so-called a lithium-ion secondary battery.

The battery includes a spirally wound electrode body 20 which includes a cathode 21 and an anode 22 spirally wound with a separator 23 in between and a pair of insulating plates 12 and 13 in a substantially hollow cylindrical-shaped battery can 11. The battery can 11 is made of, for example, nickel (Ni)-plated iron (Fe). An end portion of the battery can 11 is closed, and the other end portion thereof is opened. The pair of insulating plates 12 and 13 are arranged so that the spirally wound electrode body 20 is sandwiched therebetween, and the pair of insulating plates 12 and 13 extends in a direction perpendicular to a peripheral winding surface. A battery configuration using the battery can 11 is called a so-called cylindrical type.

In the opened end portion of the battery can 11, a battery cover 14, and a safety valve mechanism 15 and a positive temperature coefficient device (PTC device) 16 arranged inside the battery cover 14 are mounted by caulking by a gasket 17, and the interior of the battery can 11 is sealed. The battery cover 14 is made of, for example, the same material as that of the battery can 11. The safety valve mechanism 15 is electrically connected to the battery cover 14 through the PTC device 16. In the safety valve mechanism 15, when an internal pressure in the battery increases to a certain extent or higher due to an internal short circuit or external application of heat, a disk plate 15A is flipped so as to disconnect the electrical connection between the battery cover 14 and the spirally wound electrode body 20. When a temperature rises, the PTC device 16 limits a current by an increased resistance to prevent abnormal heat generation caused by a large current. The gasket 17 is made of, for example, an insulating material, and its surface is coated with asphalt.

A center pin 24 is inserted into the center of the spirally wound electrode body 20. In the spirally wound electrode body 20, a cathode lead 25 made of aluminum or the like is connected to the cathode 21, and an anode lead 26 made of nickel or the like is connected to the anode 22. The cathode lead 25 is welded to the safety valve mechanism 15 so as to be electrically connected to the battery cover 14, and the anode lead 26 is welded to the battery can 11 so as to be electrically connected to the battery can 11.

Figure 2:
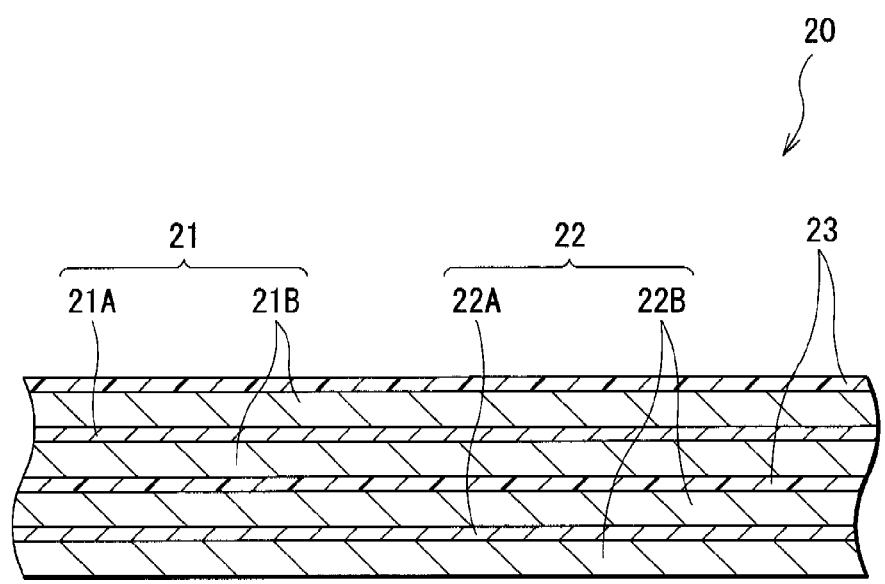
FIG. 2 is a partially enlarged sectional view of a spirally wound electrode body shown in FIG. 1.

FIG. 2 shows an enlarged view of a part of the spirally wound electrode body 20 shown in FIG. 1. The cathode 21 is formed by arranging a cathode active material layer 21B on both sides of a cathode current collector 21A having a pair of facing surfaces. In FIG. 2, the cathode active material layer 21B is arranged on both sides of the cathode current collector 21A; however, the cathode active material layer 21B may be arranged on one side of the cathode current collector 21A. The cathode current collector 21A is made of, for example, a metal material such as aluminum, nickel or stainless. The cathode active material layer 21B includes one kind or two or more kinds of cathode materials capable of inserting and extracting lithium as an electrode reactant. The cathode active material layer 21B may include an electrical conductor, a binder or the like, if necessary.

As the cathode material capable of inserting and extracting lithium, for example, lithium cobalt oxide, lithium nickel oxide, a solid solution including lithium cobalt oxide and lithium nickel oxide ($Li(Ni_xCo_yMn_z)O_2$; the values of x, y and z are $0<x<1$, $0<y<1$ and $0<z<1$, and $x+y+z=1$), lithium complex oxide such as lithium manganese oxide ($LiMn_2O_4$) with a spinel structure or a solid solution thereof ($Li(Mn_{2-v}Ni_v)O_4$; the value of v is $v<2$), or a phosphate compound with an olivine structure such as lithium iron phosphate ($LiFePO_4$) is preferable, because a high energy density may be obtained. Moreover, examples of the above-described cathode material include oxides such as titanium oxide, vanadium oxide and manganese dioxide, bisulfides such as iron bisulfide, titanium bisulfide and molybdenum sulfide, sulfur, and conductive polymers such as polyaniline and polythiophene.

The anode 22 is formed by arranging an anode active material layer 22B on both sides of an anode current collector 22A having a pair of facing surfaces. The anode active material layer 22B is arranged on both sides of the anode current collector 22A; however, the anode active material layer 22B may be arranged on one side of the anode current collector 22A. The anode current collector 22A is preferably made of a metal material having good electrochemical stability, electrical conductivity and mechanical strength. Examples of the metal material include copper (Cu), nickel, stainless and the like. Among them, as the metal material, copper is preferable, because high electrical conductivity may be obtained.

In particular, as the metal material of which the anode current collector 22A is made, a metal material including one kind or two or more kinds of metal elements which do not form an intermetallic compound with lithium is preferable. When the metal elements form an intermetallic compound with lithium, the influence of a stress due to swelling and shrinkage of the anode active material layer 22B during charge and discharge causes a fracture of the anode active material layer 22B, so the current collecting property easily declines, and the anode active martial layer 22B is easily peeled. Examples of the metal elements include copper, nickel, titanium (Ti), iron, chromium (Cr) and the like.

The anode active material layer 22B includes one kind or two or more kinds of anode material capable of inserting and extracting lithium as anode active materials. The anode active material layer 22B may include an electrical conductor, a binder or the like, if necessary. The charge capacity of the anode material capable of inserting and extracting lithium is preferably larger than a charge capacity by the cathode active material.

As the anode material capable of inserting and extracting lithium, for example, a carbon material is cited. Examples of such a carbon material include graphitizable carbon, non-graphitizable carbon with a (002) plane interval of 0.37 nm or more, graphite with a (002) plane interval of 0.34 nm or less, and the like. More specifically, kinds of pyrolytic carbon, kinds of coke, kinds of graphite, glass-like carbon fibers, fired organic polymer compound bodies, carbon fibers, activated carbon, kinds of carbon black and the like are cited. Among them, kinds of coke include pitch coke, needle coke, petroleum coke and so on, and the fired organic polymer compound bodies are polymers such as a phenolic resin and a furan resin which are carbonized by firing at an adequate temperature. These carbon materials are preferable, because a change in a crystal structure according to insertion and extraction of lithium is very small, so a high energy density may be obtained, and superior cycle characteristics may be obtained, and the carbon materials also function as electrical conductors.

As the anode material capable of inserting and extracting lithium, a material capable of inserting and extracting lithium and including at least one kind selected from the group consisting of metal elements and metalloid elements as an element is cited. Such an anode material is preferable, because a high energy density may be obtained. The anode material may be a simple substance, an alloy or a compound of a metal element or a metalloid element, or a material including a phase including one kind or two or more kinds of them at least in part. In the present invention, the alloy means an alloy including two or more kinds of metal elements as well as an alloy including one or more kinds of metal elements and one or more kinds of metalloid elements. Moreover, the alloy may include a non-metal element. As the texture of the alloy, a solid solution, a eutectic (eutectic mixture), an intermetallic compound or the coexistence of two or more kinds selected from them is cited.

As the metal element or the metalloid element included in the anode material, for example, magnesium (Mg), boron, aluminum, gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), platinum (Pt) or the like is cited. They may be crystalline or amorphous. As an alloy or a compound of any one of the metal elements and the metalloid elements, for example, an alloy or a compound represented by a chemical formula of $Ma_sMb_tLi_u$ (the values of s, t and u are $s>0$, $t≥0$ and $u≥0$, respectively) or $Ma_pMc_qMd_r$ (the values of p, q and r are $p>0$, $q>0$ and $r≥0$, respectively) or the like is cited. In the chemical formulas, Ma represents at least one kind selected from metal elements and metalloid elements capable of forming an alloy with lithium, and Mb represents at least one kind selected from metal elements and metalloid elements except for lithium and Ma. Moreover, Mc represents at least one kind of non-metal element, and Md represents at least one kind selected from metal elements and metalloid elements except for Ma.

As the anode material made of a metal element or a metalloid element capable of forming an alloy with lithium, an anode material including at least one kind selected from the group consisting of Group 4B metal elements and Group 4B metalloid elements in the short form of the periodic table of the elements as an element is preferable, and a material including at least one kind selected from silicon and tin is specifically preferable. It is because the material has a large capability to insert and extract lithium, so a high energy density may be obtained.

As the material including at least one kind selected from the group consisting of silicon and tin, for example, at least one kind selected from the group consisting of the simple substance, alloys and compounds of silicon and the simple substance, alloys and compounds of tin is cited. More specifically, a material including the simple substance, an alloy or a compound of silicon, the simple substance, an alloy or a compound of tin, or a material including a phase of one kind or two or more kinds selected from them at least in a part thereof is cited. Only one kind or a mixture of a plurality of kinds selected from them may be used.

As an alloy of silicon, for example, an alloy including at least one kind selected from the group consisting of tin, nickel, copper, iron, cobalt (Co), manganese (Mn), zinc, indium, silver, titanium, germanium, bismuth, antimony (Sb) and chromium as a second element in addition to silicon is cited. As an alloy of tin, for example, an alloy including at least one kind selected from the group consisting of silicon, nickel, copper, iron, cobalt, manganese, zinc, indium, silver, titanium, germanium, bismuth, antimony and chromium as a second element in addition to tin is cited.

As a compound of silicon or a compound of tin, for example, a compound including oxygen or carbon is cited, and in addition to silicon or tin, the compound may include the above-described second element.

As the alloy or the compound of silicon or the ally or the compound of tin, for example, $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ ($0<v\leq2$), LiSiO, $Mg_2Sn$, $SnSiO_3$, LiSnO, $SnO_w$ ($0<w\leq2$) or the like is cited.

In particular, as the material including at least one kind selected from the group consisting of silicon and tin as an element, a material including a second element and a third element in addition to tin as a first element is preferable. The second element includes at least one kind selected from the group consisting of cobalt, iron, magnesium, titanium, vanadium (V), chromium, manganese, nickel, copper, zinc, gallium, zirconium, niobium (Nb), molybdenum (Mo), silver, indium, cerium (Ce), hafnium, tantalum (Ta), tungsten (W), bismuth and silicon. The third element includes at least one kind selected from the group consisting of boron, carbon, aluminum and phosphorus. It is because when the second element and the third element are included, cycle characteristics are improved.

Among them, a CoSnC-containing material in which tin, cobalt and carbon are included as elements, and the carbon content is within a range from 9.9 wt % to 29.7 wt % both inclusive, and the ratio of cobalt to the total of tin and cobalt (Co/(Sn+Co)) is within a range from 30 wt % to 70 wt % both inclusive is preferable, because a high energy density may be obtained in such a composition range.

The CoSnC-containing material may include any other element, if necessary. The element, for example, silicon, iron, nickel, chromium, indium, niobium, germanium, titanium, molybdenum, aluminum, phosphorus, gallium, bismuth or the like is preferable, and two or more kinds selected from them may be included. It is because a higher effect may be obtained.

The CoSnC-containing material includes a phase including tin, cobalt and carbon, and the phase preferably has a low crystalline structure or an amorphous structure. Moreover, in the CoSnC-containing material, at least a part of carbon as an element is preferably bonded to a metal element or a metalloid element as another element. It is because cohesion or crystallization of tin or the like is prevented.

As a measuring method for checking the bonding state of an element, for example, X-ray photoelectron spectroscopy (XPS) is used. In the XPS, the peak of the 1s orbit (C1s) of carbon in the case of graphite is observed at 284.5 eV in an apparatus in which energy calibration is performed so that the peak of the 4f orbit (Au4f) of a gold atom is observed at 84.0 eV. Moreover, the peak of C1s of the surface contamination carbon is observed at 284.8 eV. On the other hand, in the case where the charge density of the carbon element increases, for example, in the case where carbon is bonded to a metal element or a metalloid element, the peak of C1s is observed in a region lower than 284.5 eV. In other words, in the case where the peak of the composite wave of C1s obtained in the CoSnC-containing material is observed in a region lower than 284.5 eV, at least a part of carbon included in the CoSnC-containing material is bonded to the metal element or the metalloid element which is another element.

Moreover, in the XPS measurement, for example, the peak of C1s is used to correct the energy axis of a spectrum. In general, surface contamination carbon exists on a material surface, so the peak of C1s of the surface contamination carbon is fixed at 284.8 eV, and the peak is used as an energy reference. In the XPS measurement, the waveform of the peak of C1s is obtained as a form including the peak of the surface contamination carbon and the peak of carbon in the CoSnC-containing material, so the peak of the surface contamination carbon and the peak of the carbon in the CoSnC-containing material are separated by analyzing the waveform through the use of, for example, commercially available software. In the analysis of the waveform, the position of a main peak existing on a lowest binding energy side is used as an energy reference (284.8 eV).

Further, as the anode material capable of inserting and extracting lithium, for example, a metal oxide or a polymer compound capable of inserting and extracting lithium or the like is cited. As the metal oxide, for example, iron oxide, ruthenium oxide, molybdenum oxide or the like is cited, and as the polymer compound, for example, polyacetylene, polyaniline, polypyrrole or the like is cited.

A combination of the above-described anode materials capable of inserting and extracting lithium may be used.

As the electrical conductor, for example, a carbon material such as graphite, carbon black or ketjen black is cited. Only one kind or a mixture of a plurality of kinds selected from them may be used. As long as the electrical conductor is a material having electrical conductivity, any metal material or any conductive polymer may be used.

As the binder, for example, synthetic rubber such as styrene butadiene-based rubber, fluorine-based rubber or ethylene propylene diene or a polymer material such as polyvinylidene fluoride is cited. Only one kind or a mixture of a plurality of kinds selected from them may be used. However, as shown in FIG. 1, in the case where the cathode 21 and the anode 22 are spirally wound, styrene butadiene-based rubber or fluorine-based rubber which has high flexibility is preferably used.

The separator 23 isolates between the cathode 21 and the anode 22 so that lithium ions pass therethrough while preventing a short circuit of a current due to contact between the cathode 21 and the anode 22. The separator 23 is made of, for example, a porous film of a synthetic resin such as polytetrafluoroethylene, polypropylene or polyethylene, or a porous ceramic film, and the separator 23 may have a configuration in which two or more kinds of the porous films are laminated. Among them, a porous film made of polyolefin is preferable, because a short-circuit preventing effect is superior, and the safety of the battery by a shutdown effect can be improved. In particular, polyethylene is preferable, because a shutdown effect may be obtained within a range from 100° C. to 160° C. both inclusive, and electrochemical stability is superior. Moreover, polypropylene is preferable, and any other resin having chemical stability may be used by copolymerizing or blending with polyethylene or polypropylene.

The separator 23 is impregnated with the above-described electrolytic solution as a liquid electrolyte, because while maintaining cycle characteristics, storage characteristics may be improved.

The secondary battery is manufactured by the following steps, for example.

At first, the cathode active material layer 21B is formed on both sides of the cathode current collector 21A to form the cathode 21. The cathode active material layer 21B is formed by the following steps. A cathode mixture formed by mixing cathode active material powder, the electrical conductor and the binder is dispersed in a solvent to form paste-form cathode mixture slurry, and the cathode mixture slurry is applied to the cathode current collector 21A, and the cathode mixture slurry is dried and compression molded, thereby the cathode active material layer 21B is formed. Moreover, for example, by the same steps as those in the case of the cathode 21, the anode 22 is formed by forming the anode active material layer 22B on the both sides of the anode current collector 22A.

Next, the cathode lead 25 is attached to the cathode current collector 21A by welding, and the anode lead 26 is attached to the anode current collector 22A by welding. Then, the cathode 21 and the anode 22 are spirally wound with the separator 23 in between so as to form the spirally wound electrode body 20, and an end of the cathode lead 25 is welded to the safety valve mechanism 15, and an end of the anode lead 26 is welded to the battery can 11. Next, the spirally wound electrode body 20 is sandwiched between the pair of insulating plates 12 and 13, and they are contained in the battery can 11. Next, the electrolytic solution is injected into the battery can 11 so as to impregnate the separator 23 with the electrolytic solution. Finally, the battery cover 14, the safety valve mechanism 15 and the PTC device 16 are fixed in an opened end portion of the battery can 11 by caulking by the gasket 17. Thereby, the secondary battery shown in FIGS. 1 and 2 is completed.

When the secondary battery is charged, lithium ions are extracted from the cathode 21, and are inserted into the anode 22 through the electrolytic solution. On the other hand, when the secondary battery is discharged, the lithium ions are extracted from the anode 22 and are inserted into the cathode 21 through the electrolytic solution.

In the cylindrical secondary battery, in the case where the capacity of the anode is represented by a capacity component based on insertion and extraction of lithium, the above-described electrolytic solution is included, so the decomposition of the electrolytic solution is prevented. Therefore, high-temperature characteristics such as storage characteristics may be improved. Other effects relating to the secondary battery are the same as those in the above-described electrolytic solution.

Next, second and third batteries will be described below, and like components are denoted by like numerals as of the first battery, and will not be further described.

(Second Battery)

The second battery has the same configuration, functions and effects as those of the first battery, except for the configuration of an anode 22 is different, and the second battery is manufactured by the same method as that of the first battery.

The anode 22 has a configuration in which the anode active material layer 22B is arranged on both sides of the anode current collector 22A as in the case of the first battery. As the anode active material, the anode active material layer 22B includes, for example, a material including tin or silicon as an element. More specifically, for example, the anode active material includes the simple substance, an alloy or a compound of tin, or the simple substance, an alloy or a compound of silicon, and the anode active material may include two or more kinds selected from them.

The anode active material layer 22B is formed by, for example, a vapor-phase method, a liquid-phase method, a spraying method or a firing method, or a combination of two or more methods selected from them, and the anode active material layer 22B and the anode current collector 22A are preferably alloyed in at least a part of an interface therebetween. More specifically, in the interface, an element of the anode current collector 22A is preferably diffused into the anode active material layer 22B, or an element of the anode active material layer 22B is preferably diffused into the anode current collector 22A, or they are preferably diffused into each other, because a fracture of the anode active material layer 22B due to swelling and shrinkage thereof according to charge and discharge may be inhibited, and the electronic conductivity between the anode active material layer 22B and the anode current collector 22A may be improved.

As the vapor-phase method, for example, a physical deposition method or a chemical deposition method, more specifically, a vacuum deposition method, a sputtering method, an ion plating method, a laser ablation method, a thermal CVD (chemical vapor deposition) method, a plasma chemical vapor deposition method or the like is cited. As the liquid-phase method, a known technique such as electrolytic plating or electroless plating may be used. In the firing method, for example, a particulate anode active material is mixed with a binder or the like to form a mixture, and the mixture is applied by dispersing the mixture in a solvent, and then the mixture is heated at a higher temperature than the melting point of the binder or the like. As the firing method, a known technique such as, for example, an atmosphere firing method, a reaction firing method or a hot press firing method is cited.

(Third Battery)

In a third battery, the capacity of the anode 22 is represented by a capacity component based on precipitation and dissolution of lithium, and the third battery is a so-called lithium metal secondary battery. The secondary battery has the same configuration as that of the first battery, except that the anode active material layer 22B is made of lithium metal, and the secondary battery is manufactured by the same method as that of the first battery.

The secondary battery uses lithium metal as the anode active material, so a higher energy density may be obtained. The anode active material layer 22B may exist at the time of assembling, or may not exist at the time of assembling, and may be formed of lithium metal precipitated at the time of charge. Moreover, the anode active material layer 22B may be used also as a current collector, thereby the anode current collector 22A may be removed.

When the secondary battery is charged, lithium ions are extracted from the cathode 21, and the lithium ions are precipitated on the surface of the anode current collector 22A as lithium metal through the electrolytic solution. When the secondary battery is discharged, the lithium metal is dissolved from the anode active material layer 22B as lithium ions, and the lithium ions are inserted into the cathode 21 through the electrolytic solution.

In the cylindrical secondary battery, in the case where the capacity of the anode 22 is represented by a capacity component based on precipitation and dissolution of lithium, the above-described electrolytic solution is included, so the high-temperature characteristics such as the storage characteristics may be improved. Other effects relating to the secondary battery are the same as those in the first battery.

(Fourth Battery)

Figure 3:
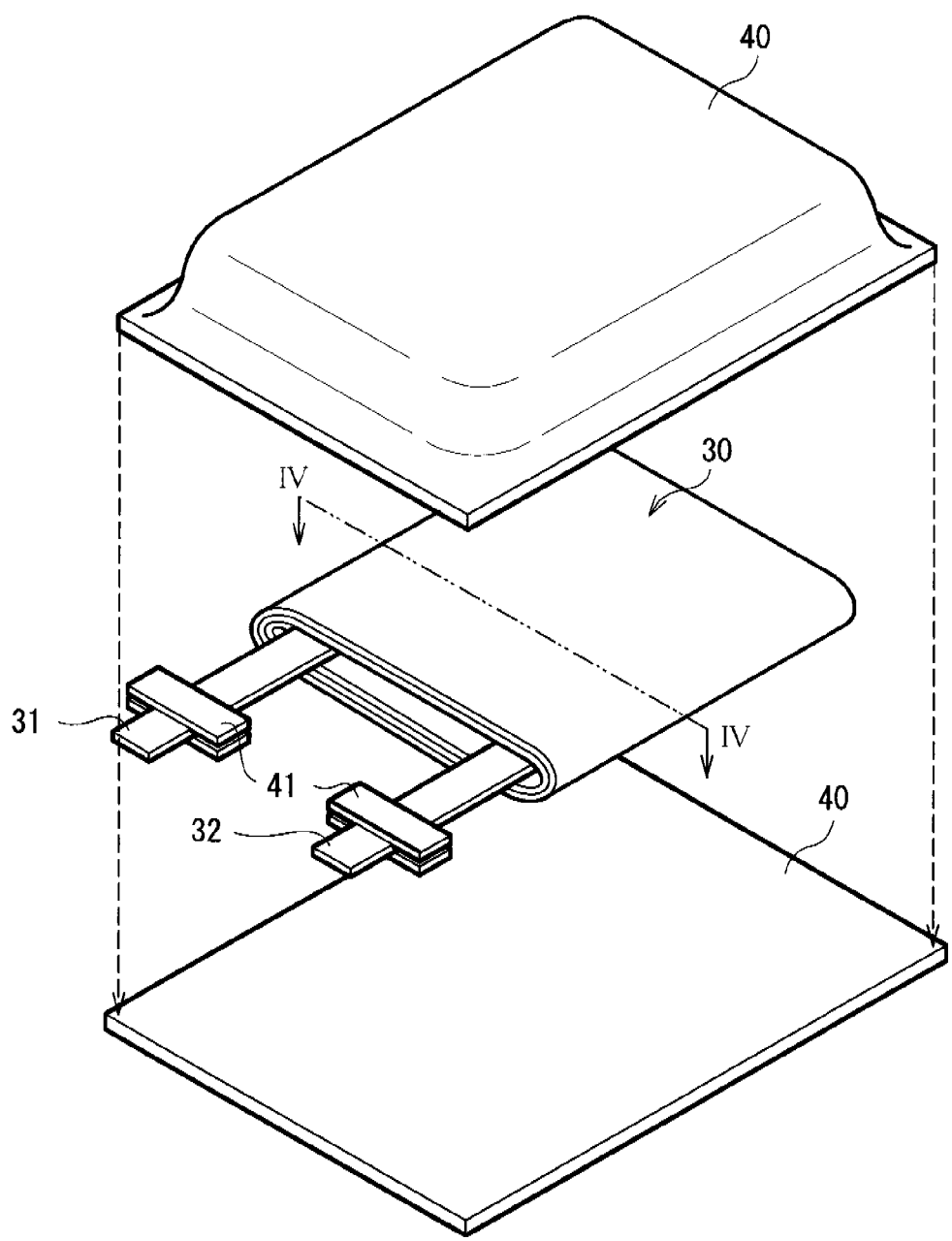
FIG. 3 is an exploded perspective view of a fourth battery using the electrolytic solution according to the embodiment of the invention.

FIG. 3 shows an exploded perspective view of a fourth battery. In the battery, a spirally wound electrode body 30 to which a cathode lead 31 and an anode lead 32 are attached is contained in film-shaped package members 40, and the configuration of the battery is a so-called laminate film type.

The cathode lead 31 and the anode lead 32 are drawn, for example, from the interiors of the package members 40 to outside in the same direction. The cathode lead 31 is made of, for example, a metal material such as aluminum, and the anode lead 32 are made of, for example, a metal material such as copper, nickel or stainless. The metal materials of which the cathode lead 31 and the anode lead 32 are made each have a sheet shape or a mesh shape.

The package members 40 are made of, for example, a rectangular aluminum laminate film including a nylon film, aluminum foil and a polyethylene film which are bonded in this order. The package members 40 are arranged so that the polyethylene film of each of the package members 40 faces the spirally wound electrode body 30, and edge portions of the package members 40 are adhered to each other by fusion bonding or an adhesive. An adhesive film 41 is inserted between the package members 40 and the cathode lead 31 and the anode lead 32 for preventing the entry of outside air. The adhesive film 41 is made of, for example, a material having adhesion to the cathode lead 31 and the anode lead 32, for example, a polyolefin resin such as polyethylene, polypropylene, modified polyethylene or modified polypropylene.

In addition, the package members 40 may be made of a laminate film with any other configuration, a polymer film such as polypropylene or a metal film instead of the above-described three-layer aluminum laminate film.

Figure 4:
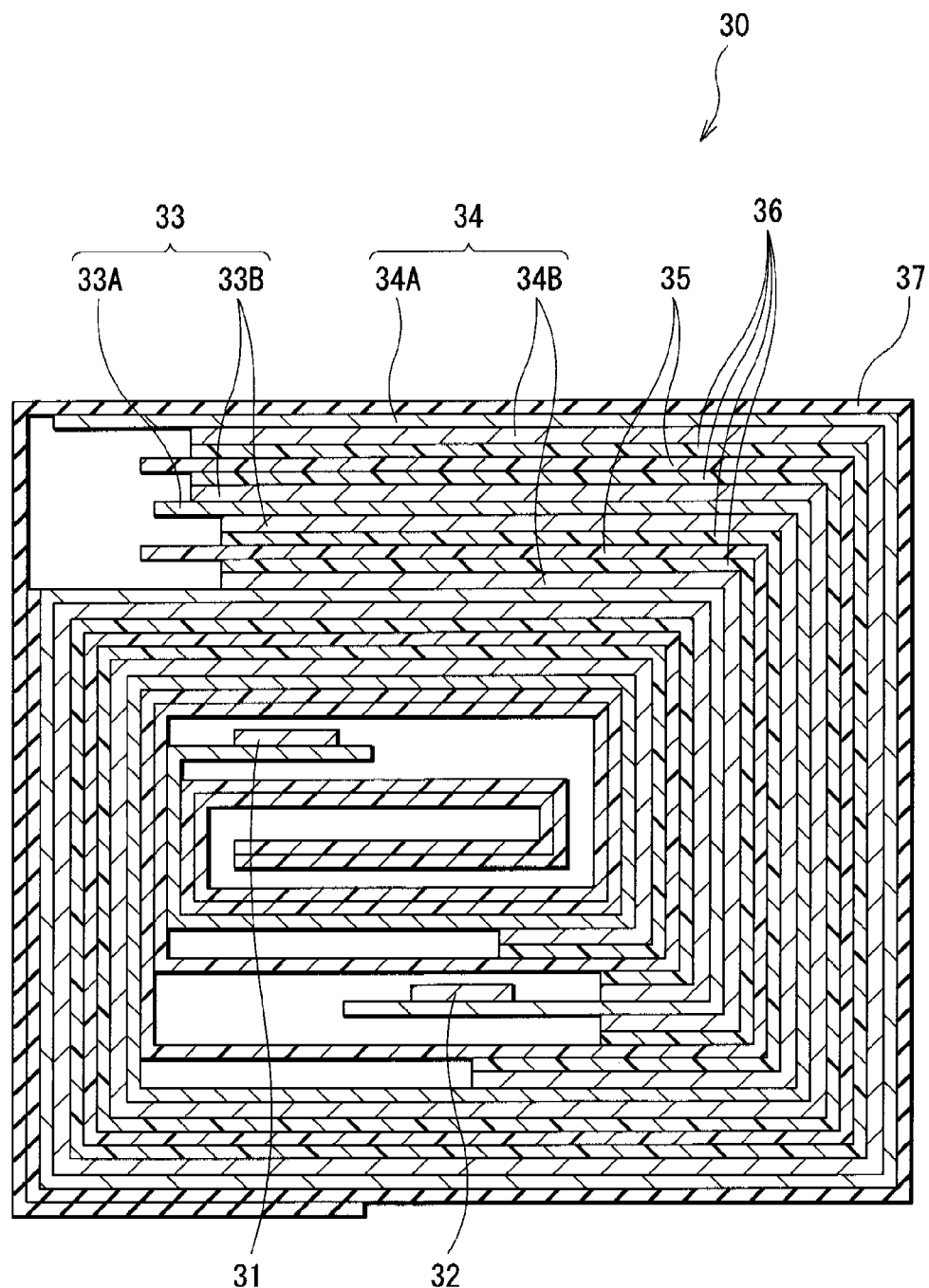
FIG. 4 is a sectional view showing a spirally wound electrode body taken along a line IV-IV of FIG. 3.

FIG. 4 shows a sectional view of the spirally wound electrode body 30 taken along a line I-I of FIG. 3. The spirally wound electrode body 30 is formed by laminating a cathode 33 and an anode 34 with a separator 35 and an electrolyte 36 in between, and then spirally winding them, and an outermost portion of the spirally wound electrode body 30 is protected with a protective tape 37.

The cathode 33 is formed by arranging a cathode active material layer 33B on both sides of a cathode current collector 33A. The anode 34 is formed by arranging an anode active material layer 34B on both sides of an anode current collector 34A, and the anode 34 is arranged so that the anode active material layer 34B faces the cathode active material layer 33B. The configurations of the cathode current collector 33A, the cathode active material layer 33B, the anode current collector 34A, the anode active material layer 34B and the separator 35 are the same as those of the cathode current collector 21A, the cathode active material layer 21B, the anode current collector 22A, the anode active material layer 22B and the separator 23 in the above-described first, second and third batteries, respectively.

The electrolyte 36 includes the above-described electrolytic solution and a polymer compound holding the electrolytic solution, and is a so-called gel electrolyte. The gel electrolyte is preferable, because the gel electrolyte is able to obtain high ionic conductivity (for example, 1 mS/cm or over at room temperature), and leakage of an electrolyte from the battery is prevented.

Examples of the polymer compound include polyacrylonitrile, polyvinylidene fluoride, a copolymer of polyvinylidene fluoride and polyhexafluoropyrene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acids, polymethacrylic acids, styrene-butadiene rubber, nitrile-butadiene rubber, polystyrene, polycarbonate and the like. One kind or a mixture of a plurality of kinds selected from them may be used. In particular, in terms of electrochemical stability, polyacrylonitrile, polyvinylidene fluoride, polyhexafluoropropylene, polyethylene oxide or the like is preferably used. The content of the polymer compound in the electrolytic solution depends on compatibility between them, but is preferably within a range from 5 wt % to 50 wt % both inclusive.

The content of the electrolyte salt is the same as that in the case of the above-described first, second and third batteries. The solvent in this case has a wide concept including not only a liquid solvent but also a solvent having ionic conductivity capable of dissociating the electrolyte salt. Therefore, in the case where a polymer compound having ionic conductivity is used, the polymer compound is included in the concept of the solvent.

In addition, as the electrolyte 36, instead of an electrolyte in which the polymer compound holds the electrolytic solution, the electrolytic solution may be used as it is. In this case, the separator 35 is impregnated with the electrolytic solution.

The secondary battery may be manufactured by the following three kinds of manufacturing methods, for example.

In a first manufacturing method, by the same steps as those in the method of manufacturing the first battery, at first, the cathode active material layer 33B are formed on both sides of the cathode current collector 33A so as to form the cathode 33. Moreover, for example, by the same steps as those in the method of manufacturing the first battery, the anode active material layer 34B is formed on both sides of the anode current collector 34A so as to form the anode 34.

Next, the gel electrolyte 36 is formed by preparing a precursor solution including the electrolytic solution, the polymer compound and a solvent, applying the precursor solution to the cathode 33 and the anode 34, and volatilizing the solvent. Next, the cathode lead 31 and the anode lead 32 are attached to the cathode current collector 33A and the anode current collector 34A, respectively. Next, after the cathode 33 on which the electrolyte 36 is formed and the anode 34 on which the electrolyte 36 is formed are laminated with the separator 35 in between to form a laminate, the laminate is spirally wound in a longitudinal direction, and the protective tape 37 is bonded to an outermost portion of the laminate so as to form the spirally wound electrode body 30. Then, for example, the spirally wound electrode body 30 is sandwiched between two film-shaped package members 40, and edge portions of the package members 40 are adhered to each other by thermal fusion bonding or the like to seal the spirally wound electrode body 30 in the package members 40. At this time, the adhesive film 41 is inserted between the cathode lead 31 and the anode lead 32, and the package members 40. Thereby, the secondary battery shown in FIGS. 3 and 4 is completed.

In a second manufacturing method, at first, after the cathode lead 31 and the anode lead 32 are attached to the cathode 33 and the anode 34, respectively, the cathode 33 and the anode 34 are laminated with the separator 35 in between to form a laminate, and the laminate is spirally wound, and the protective tape 37 is bonded to an outermost portion of the spirally wound laminate so as to form a spirally wound body as a precursor body of the spirally wound electrode body 30. Next, the spirally wound body is sandwiched between two film-shaped package members 40, and the edge portions of the package members 40 except for edge portions on one side are adhered by thermal fusion bonding or the like to form a pouched package, thereby the spirally wound body is contained in the package members 40. An electrolytic composition which includes the electrolytic solution, monomers as materials of a polymer compound and a polymerization initiator and, if necessary, any other material such as a polymerization inhibitor is prepared, and the composition is injected in the package members 40, and then an opened portion of the package members 40 is sealed by thermal fusion bonding or the like. Finally, the monomers are polymerized by applying heat to form the polymer compound, thereby the gel electrolyte 36 is formed. Thus, the secondary battery is completed.

In a third manufacturing method, as in the case of the first manufacturing method, the spirally wound body is formed, and the spirally wound body is contained in the package members 40, except that the separator 35 with both sides coated with a polymer compound is used. As the polymer compound applied to the separator 35, for example, a polymer including vinylidene fluoride as a component, that is, a homopolymer, a copolymer, a multicomponent copolymer, or the like is cited. More specifically, polyvinylidene fluoride, a binary copolymer including vinylidene fluoride and hexafluoropropylene as components, a ternary copolymer including vinylidene fluoride, hexafluoropropylene and chlorotrifluoroethylene as components is cited. The polymer compound may include one kind or two or more kinds of other polymer compounds in addition to the above-described polymer including vinylidene fluoride as a component. Next, after the electrolytic solution is prepared, and injected into the package members 40, an opened portion of the package members 40 are sealed by thermal fusion bonding or the like. Finally, the package members 40 are heated while being weighted so that the separator 35 is brought into close contact with the cathode 33 and the anode 34 with the polymer compound in between. Thereby, the polymer compound is impregnated with the electrolytic solution, and the polymer compound is gelatinized so as to form the electrolyte 36, so the secondary battery is completed. In the third manufacturing method, compared to the first manufacturing method, swelling characteristics are improved. Moreover, in the third manufacturing method, compared to the second manufacturing method, monomers as the materials of the polymer compound, the solvent or the like hardly remain in the electrolyte 36, and a step of forming the polymer compound is controlled well, so sufficient adhesion between the cathode 33 and anode 34, and the separator 35 and the electrolyte 36 is obtained.

The functions and effects of the laminate type secondary battery are the same as those in the first battery.

(Fifth Battery)

Figure 5:
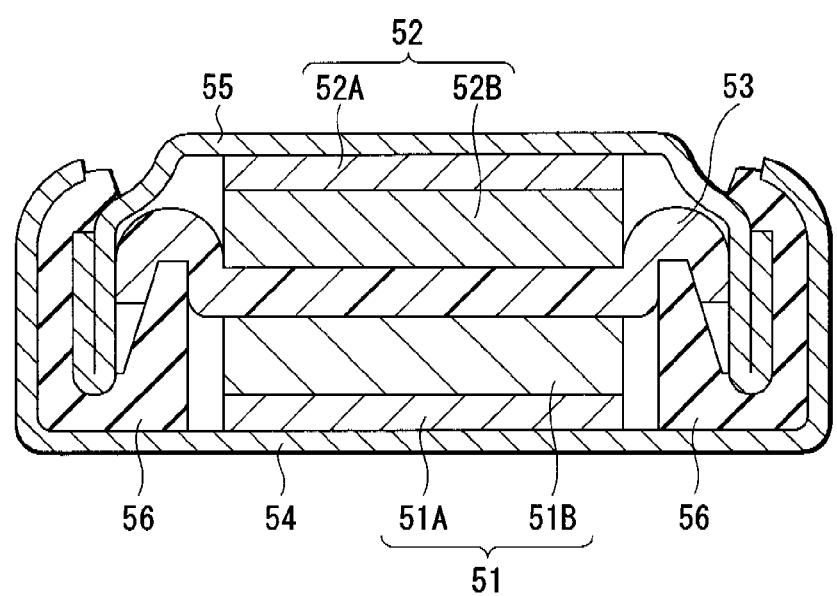
FIG. 5 is a sectional view showing the configuration of a fifth battery using the electrolytic solution according to the embodiment of the invention.

FIG. 5 shows a sectional view of a fifth battery. The battery is manufactured by the following steps. A cathode 51 is bonded to a package can 54, and an anode 52 is contained in a package cup 55, and the package can 54 and the package cup 55 are laminated with a separator 53 which is impregnated with the electrolytic solution in between, and then they are caulked by a gasket 56. A battery configuration using the package can 54 and the package cup 55 is called a so-called coin type.

The cathode 51 is formed by applying a cathode active material layer 51B on one side of a cathode current collector 61A. The anode 52 is formed by applying an anode active material layer 52B on one side of the anode current collector 52A. The configurations of the cathode current collector 61A, the cathode active material layer 52B, the anode current collector 52A, the anode active material layer 52B and the separator 53 are the same as those of the cathode current collector 21A, the cathode active material layer 21B, the anode current collector 22A, the anode active material layer 22B and the separator 23 in the first, second and third batteries, respectively.

The functions and effects of the coin type secondary battery are the same as those in the first battery.

EXAMPLES

Specific examples of the invention will be described in detail below.

Example 1-1

A cylindrical secondary battery shown in FIGS. 1 and 2 was formed through the use of artificial graphite as an anode active material. At that time, the secondary battery was a lithium-ion secondary battery in which the capacity of the anode 22 was represented by a capacity component based on insertion and extraction of lithium.

At first, the cathode 21 was formed. In this case, after lithium carbonate ($Li_2CO_3$) and cobalt carbonate ($CoCO_3$) were mixed at a molar ratio of 0.5:1, the mixture was fired in air at 900° C. for 5 hours to obtain a lithium-cobalt complex oxide. Next, after 91 parts by weight of the lithium-cobalt complex oxide as a cathode active material, 6 parts by weight of graphite as an electrical conductor and 3 parts by weight of polyvinylidene fluoride as a binder were mixed to form a cathode mixture, the cathode mixture was dispersed in N-methyl-2-pyrrolidone to form paste-form cathode mixture slurry. Then, after the cathode mixture slurry was uniformly applied to the cathode current collector 21A made of strip-shaped aluminum foil (with a thickness of 20 μm), and was dried, the cathode mixture slurry was compression molded by a roller press to form the cathode active material layer 21B. After that, the cathode lead 25 was attached to an end of the cathode current collector 21A.

Next, the anode 22 was formed. In this case, 90 parts by weight of graphite powder as an anode active material and 10 parts by weight of polyvinylidene fluoride as a binder were mixed to form an anode mixture, and then the anode mixture was dispersed in N-methyl-2-pyrrolidone to form paste-form anode mixture slurry. Then, after the anode mixture slurry was uniformly applied to the anode current collector 22A made of strip-shaped copper foil (with a thickness of 15 μm), and was dried, the anode mixture slurry was compression molded by a roller press to form the anode active material layer 22B. After that, the anode lead 26 was attached to an end of the anode current collector 22A.

Next, the electrolytic solution was prepared. In this case, at first, after ethylene carbonate (EC) and dimethyl carbonate (DMC) as main solvents were mixed at a weight ratio of 30:70, 4-fluoro-1,3-dioxolane-2-one (FEC) as the cyclic carbonate represented by Chemical Formula 11 which included a halogen as a main solvent and the compound represented by Chemical Formula 23 as the compound represented by Chemical Formula 13 as a sub solvent were added to the mixture to obtain a solvent. At that time, the content of FEC in the solvent was 1 wt %, and the content of the compound represented by Chemical Formula 23 was 0.1 wt %. The unit "wt %" means a value in the case where the whole solvent including the main solvent and the sub solvent is 100 wt %, and hereinafter the meaning of "wt %" is the same. After that, lithium hexafluorophosphate ($LiPF_6$) as an electrolyte salt was added to and dissolved in the solvent so that the concentration of the electrolyte salt in the electrolytic solution became 1 mol/kg.

Next, the separator 23 made of a microporous polypropylene film (with a thickness of 25 μm) was prepared, and the anode 22, the separator 23, the cathode 21 and the separator 23 were laminated in this order to form a laminate, and then the laminate was spirally wound several times to form the spirally wound electrode body 20. Then, the spirally wound electrode body 20 was sandwiched between a pair of insulating plates 12 and 13, and the anode lead 26 was welded to the battery can 11, and the cathode lead 25 was welded to the safety valve mechanism 15, and then the spirally wound electrode body 20 was contained in the battery can 11 made of nickel-plated iron. Finally, the electrolytic solution was injected into the battery can 11 by a decompression method so as to form the cylindrical secondary battery.

Examples 1-2 to 1-4

Secondary batteries were formed by the same steps as those in Example 1-1, except that instead of FEC, as the main solvent, trans-4,5-difluoro-1,3-dioxolane-2-one (t-DFEC: Example 1-2) or cis-4,5-difluoro-1,3-dioxolane-2-one (c-DFEC: Example 1-3) as the cyclic carbonate represented by Chemical Formula 11 which included a halogen, or bis(fluoromethyl) carbonate (DFDMC: Example 1-4) as the chain carbonate represented by Chemical Formula 12 which included a halogen was used.

Examples 1-5, 1-6

Secondary batteries were formed by the same steps as those in Example 1-1, except that instead of the compound represented by Chemical Formula 23 as the sub solvent, the compound represented by Chemical Formula 24 as the compound represented by Chemical Formula 14 (Example 1-6) or the compound represented by Chemical Formula 25 as the compound represented by Chemical Formula 15 (Example 1-6) was used.

Example 1-7

A secondary battery was formed by the same steps as those in Example 1-1, except that as the sub solvent, the compound represented by Chemical Formula 24 was added. At that time, the content of the compound represented by Chemical Formula 23 in the solvent was 0.05 wt %, and the content of the compound represented by Chemical Formula 24 was 0.05 wt %.

Examples 1-8 to 1-11

Secondary batteries were formed by the same steps as those in Examples 1-1 to 1-4, except that as an auxiliary solvent, the compound represented by Chemical Formula 27 as the compound represented by Chemical Formula 26 was added. At that time, the compound represented by Chemical Formula 27 in the solvent was 0.01 wt %.

Comparative Example 1-1

A secondary battery was formed by the same steps as those in Example 1-1, except that FEC as the main solvent and the compound represented by Chemical Formula 23 as the sub solvent were not added.

Comparative Examples 1-2, 1-3

Secondary batteries were formed by the same steps as those in Examples 1-1 and 1-2, except that the compound represented by Chemical Formula 23 as the sub solvent was not added.

Comparative Example 1-4

A secondary battery was formed by the same steps as those in Example 1-1, except that FEC as the main solvent was not added.

When the storage characteristics and the cycle characteristics of the secondary batteries of Examples 1-1 to 1-11 and Comparative Examples 1-1 to 1-4 were determined, results shown in Table 1 were obtained.

To determine the storage characteristics, the secondary batteries were stored by the following steps, and then the discharge capacity retention ratios (hereinafter referred to as "storage discharge capacity retention ratios") of the secondary batteries were determined. At first, 2 cycles of charge and discharge were performed in an atmosphere at 23° C., and then the discharge capacity in the second cycle (the discharge capacity before storing) of each of the secondary batteries was determined. Next, after the secondary batteries which were charged again were stored for 1 month in a constant temperature bath at 60° C., the secondary batteries were discharged in an atmosphere at 23° C., and then the discharge capacity in the third cycle (the discharge capacity after storing) of each of the secondary batteries was determined. Finally, the storage discharge capacity retention ratio (%)=(discharge capacity after storing/discharge capacity before storing)×100 was determined by calculation. As the conditions of 1 cycle of charge, after the secondary batteries were charged at a constant current of 1 C until the battery voltage reached 4.2 V, the secondary batteries were charged at a constant voltage of 4.2 V until the total charge time reached 2 hours. Moreover, as the conditions of 1 cycle of discharge, the secondary batteries were discharged at a constant current of 0.5 C until the battery voltage reached 3.0 V. The unit "C" represents a value showing a current condition, and "1 C" represents a current value at which the theoretical capacity of the battery is fully discharged for 1 hour, and "0.5 C" represents a current value at which the theoretical capacity of the battery is fully discharged for 2 hours.

To determine the cycle characteristics, after the secondary batteries were repeatedly charged and discharged by the following steps, the discharge capacity retention ratios (hereinafter referred to as "cycle discharge capacity retention ratios") of the secondary batteries were determined. At first, 2 cycles of charge and discharge were performed in an atmosphere at 23° C., and then the discharge capacity in the second cycle of each of the secondary batteries was determined. Next, 102 cycles of charge and discharge in total were performed in a constant temperature bath at 60° C., and then the discharge capacity in the 102nd cycle of each of the secondary batteries was determined. Finally, the cycle discharge capacity retention ratio (%)=(discharge capacity in the 102nd cycle/discharge capacity in the second cycle)×100 was determined by calculation. The conditions of 1 cycle of charge and discharge were the same as those in the case where the storage characteristics were determined.

In addition, the same steps and the same conditions as the above-described steps and the above-described conditions were used to determine the storage characteristics and the cycle characteristics of secondary batteries in the following examples and the following comparative examples.

More specifically, in Comparative Examples 1-2 and 1-3 which did not include the sub solvent and included only the main solvent, or Comparative Example 1-4 which did not include the main solvent and included only the sub solvent, the storage discharge capacity retention ratio and the cycle discharge capacity retention ratio were higher than those in Comparative Example 1-1 which did not include the main solvent and the sub solvent. However, in Examples 1-1 to 1-11 which included the main solvent and the sub solvent, the storage discharge capacity retention ratio and the cycle discharge capacity retention ratio were further higher than those in Comparative Examples 1-2 to 1-4.

Regarding the kind of the main solvent, in Examples 1-2 to 1-4 which included t-DFEC, c-DFEC or DFDMC, a storage discharge capacity retention ratio equal to or higher than that in Example 1-1 which included FEC was obtained, and a higher cycle discharge capacity retention ratio was obtained. Moreover, regarding the kind of the sub solvent, in Examples 1-5 and 1-6 which included the compound represented by Chemical Formula 24 or 25, a storage discharge capacity retention ratio substantially equal to that in Example 1-1 which included the compound represented by

TABLE 1

Anode active material: artificial graphite

| | ELECTROLYTE SALT | SOLVENT | | | DISCHARGE CAPACITY RETENTION RATIO (%) | |
| --- | --- | --- | --- | --- | --- | --- |
| | | MAIN SOLVENT | SUB SOLVENT | AUXILIARY SOLVENT | STORAGE | CYCLE |
| EXAMPLE 1-1 | $LiPF_6$ | EC + DMC | FEC | CHEMICAL FORMULA 23 | — | 86 | 81 |
| EXAMPLE 1-2 | 1 mol/kg | | t-DFEC | | | 86 | 85 |
| EXAMPLE 1-3 | | | c-DFEC | | | 86 | 85 |
| EXAMPLE 1-4 | | | DFDMC | | | 88 | 83 |
| EXAMPLE 1-5 | | | FEC | CHEMICAL FORMULA 24 | | 86 | 81 |
| EXAMPLE 1-6 | | | | CHEMICAL FORMULA 25 | | 85 | 81 |
| EXAMPLE 1-7 | | | | CHEMICAL FOMULA 23 + CHEMICAL FORMULA 24 | | 86 | 81 |
| EXAMPLE 1-8 | | | FEC | CHEMICAL FORMULA 23 | CHEMICAL FORMULA 27 | 88 | 81 |
| EXAMPLE 1-9 | | | t-DFEC | | | 86 | 84 |
| EXAMPLE 1-10 | | | c-DFEC | | | 86 | 84 |
| EXAMPLE 1-11 | | | DFDMC | | | 88 | 81 |
| COMPARATIVE EXAMPLE 1-1 | $LiPF_6$ 1 mol/kg | EC + DMC | — | — | — | 81 | 75 |
| COMPARATIVE EXAMPLE 1-2 | | | FEC | — | | 83 | 80 |
| COMPARATIVE EXAMPLE 1-3 | | | t-DFEC | — | | 83 | 82 |
| COMPARATIVE EXAMPLE 1-4 | | | — | CHEMICAL FORMULA 23 | | 82 | 77 |

As shown in Table 1, in Examples 1-1 to 1-11 which included FEC or the like as the main solvent, and the compound represented by Chemical Formula 23 or the like as the sub solvent, the storage discharge capacity retention ratio was higher than that in Comparative Examples 1-1 to 1-4 which did not include the main solvent and the sub solvent, and the cycle discharge capacity retention ratio was higher.

Chemical Formula 23, and a cycle discharge capacity retention ratio equal to that in Example 1-1 were obtained. This tendency was the same in Example 1-7 which included a mixture of the compounds represented by Chemical Formulas 23 and 24. Moreover, regarding the presence or absence of the auxiliary solvent, in Examples 1-8 to 1-11 which included the compound represented by Chemical Formula 27, a storage discharge capacity retention ratio and a cycle discharge capacity retention ratio equal to or higher than those in Examples 1-1 to 1-4 which did not include the compound were obtained.

Therefore, it was confirmed that in the secondary battery according to the embodiment of the invention, in the case where the anode 22 included artificial graphite as the anode active material, when the solvent of the electrolytic solution included at least one kind selected from the group consisting of the cyclic carbonate represented by Chemical Formula 11 which included a halogen and the chain carbonate represented by Chemical Formula 12 which included a halogen as the main solvent, and at least one kind selected from the group consisting of the compounds represented by Chemical Formulas 13, 14 and 15 as the sub solvent, the storage characteristics in a high-temperature atmosphere were improved, and the cycle characteristics were also improved. In this case, it was confirmed that when a cyclic carbonate including a plurality of halogens or a chain carbonate including a plurality of halogens was used as the above-described cyclic carbonate or the above-described chain carbonate including a halogen, or when the compound represented by Chemical Formula 27 was included as the auxiliary solvent, higher effects were obtained.

The result in the case where fluoromethyl methyl carbonate is used as the chain carbonate represented by Chemical Formula 12 which includes a halogen is not shown here; however, fluoromethyl methyl carbonate has the same properties as bis(fluoromethyl)carbonate, so it is obvious that even in the case where fluromethyl methyl carbonate is used, the same effects as those in the case where bis(fluoromethyl) carbonate is used are obtained. The same holds for the case where the cyclic carbonate represented by Chemical Formula 11 which includes a halogen and the chain carbonate represented by Chemical Formula 12 which includes a halogen are mixed.

Examples 2-1 to 2-5

Secondary batteries were formed by the same steps as those in Example 1-1, except that the content of the sub solvent in the solvent was changed to 0.001 wt % (Example 2-1), 0.2 wt % (Example 2-2), 1 wt % (Example 2-3), 5 wt % (Example 2-4) and 10 wt % (Example 2-5).

When the storage characteristics and the cycle characteristics of the secondary batteries of Examples 2-1 to 2-5 were determined, results shown in Table 2 were obtained.

As shown in Table 2, in Example 2-1 to 2-5 in which the content of the sub solvent was changed within a range from 0.001 wt % to 10 wt % both inclusive, independent of the content, a higher storage discharge capacity retention ratio than those in Comparative Examples 1-2 and 1-4 was obtained. Regarding the cycle discharge capacity retention ratio, there was a tendency that as the content of the sub solvent increased, the cycle discharge capacity retention ratio was increased, then decreased, and when the content of the sub solvent was reduced to 0.001 wt %, or increased to 10 wt %, the cycle discharge capacity retention ratio was substantially constant. In this case, when the content of the sub solvent was 1 wt % or less, a cycle discharge capacity retention ratio equal to or higher than that in Comparative Examples 1-2 and 1-4 was obtained, and when the content was 0.1 wt % or over, a higher cycle discharge capacity retention ratio than that in Comparative Examples 1-2 and 1-4 was obtained.

Therefore, it was confirmed that in the above-described secondary battery according to the embodiment of the invention, in the case where the solvent of the electrolytic solution included the compound represented by Chemical Formula 23 as the sub solvent, when the content of the sub solvent was within a range from 0.001 wt % to 10 wt % both inclusive, the storage characteristics in a high-temperature atmosphere were improved, and when the content was within a range from 0.001 wt % to 1 wt % both inclusive, the cycle characteristics were secured, and when the content was within a range from 0.1 wt % to 1 wt % both inclusive, the cycle characteristics were also improved.

Examples 3-1 to 3-4

Secondary batteries were formed by the same steps as those in Example 1-1, except that as other solvents, vinylene carbonate (VC; Example 3-1), propene sultone (PRS: Example 3-2), succinic anhydride (SCAH: Example 3-3) and sulfobenzoic anhydride (SBAH; Example 3-4) were used. At that time, the content of VC or the like in the solvent was 1 wt %.

When the storage characteristics and the cycle characteristics of the secondary batteries of Examples 3-1 to 3-4 were determined, results shown in Table 3 were obtained.

TABLE 2

Anode active material: artificial graphite

| | ELECTROLYTE SALT | SOLVENT | | | | DISCHARGE CAPACITY RETENTION RATIO (%) | |
|---|---|---|---|---|---|---|---|
| | | MAIN SOLVENT | | SUB SOLVENT | | STORAGE | CYCLE |
| EXAMPLE 2-1 | $LiPF_6$ | EC + DMC | FEC | CHEMICAL FORMULA 23 | 0.001 wt % | 84 | 80 |
| EXAMPLE 1-1 | 1 mol/kg | | | | 0.1 wt % | 86 | 81 |
| EXAMPLE 2-2 | | | | | 0.2 wt % | 89 | 83 |
| EXAMPLE 2-3 | | | | | 1 wt % | 88 | 82 |
| EXAMPLE 2-4 | | | | | 5 wt % | 85 | 78 |
| EXAMPLE 2-5 | | | | | 10 wt % | 84 | 76 |
| COMPARATIVE EXAMPLE 1-2 | $LiPF_6$ 1 mol/kg | EC + DMC | FEC | — | — | 83 | 80 |
| COMPARATIVE EXAMPLE 1-4 | | | — | CHEMICAL FORMULA 23 | 0.1 wt % | 82 | 77 |

TABLE 3

Anode active material: artificial graphite

| | ELECTROLYTE SALT | SOLVENT MAIN SOLVENT | SUB SOLVENT | OTHERS | DISCHARGE CAPACITY RETENTION RATIO (%) STORAGE | CYCLE |
|---|---|---|---|---|---|---|
| EXAMPLE 1-1 | LiPF$_6$ 1 mol/kg | EC + DMC | FEC | CHEMICAL FORMULA 23 | — | 86 | 81 |
| EXAMPLE 3-1 | | | | VC | 87 | 82 |
| EXAMPLE 3-2 | | | | PRS | 90 | 81 |
| EXAMPLE 3-3 | | | | SCAH | 90 | 82 |
| EXAMPLE 3-4 | | | | SBAH | 90 | 83 |

As shown in Table 3, in Examples 3-1 to 3-4 in which the solvent included VC or the like, a higher storage discharge capacity retention ratio than that in Example 1-1 in which the solvent did not include the other solvent was obtained, and a cycle discharge capacity retention ratio equal to or higher than that in Example 1-1 was obtained.

Therefore, it was confirmed that in the secondary battery according to the embodiment of the invention, when the solvent of the electrolytic solution included a cyclic carbonate having an unsaturated bond, a sultone or an acid anhydride, higher effects were obtained.

Examples 4-1 to 4-3

Secondary batteries were formed by the same steps as those in Example 1-1, except that as the electrolyte salt, lithium tetrafluoroborate (LiBF$_4$: Example 4-1), the compound represented by Chemical Formula 30(6) as the compound represented by Chemical Formula 28 (Example 4-2), or the compound represented by Chemical Formula 34(2) as the compound represented by Chemical Formula 32 (Example 4-3) was added. At that time, the concentration of LiPF$_6$ in the electrolytic solution was 0.9 mol/kg, and the concentration of LiBF$_4$ or the like was 0.1 mol/kg.

Comparative Example 4

A secondary battery was formed by the same steps as those in Example 4-2, except that FEC was not included as the main solvent.

When the storage characteristics and the cycle characteristics of the secondary batteries of Examples 4-3 and Comparative Example 4 were determined, results shown in Table 4 were obtained.

TABLE 4

Anode active material: artificial graphite

| | ELECTROLYTE SALT | | SOLVENT MAIN SOLVENT | SUB SOLVENT | DISCHARGE CAPACITY RETENTION RATIO (%) STORAGE | CYCLE |
|---|---|---|---|---|---|---|
| EXAMPLE 1-1 | LiPF$_6$ 1 mol/kg | | EC + DMC | FEC CHEMICAL FORMULA 23 | 86 | 81 |
| EXAMPLE 4-1 | LiPF$_6$ 0.9 mol/kg | LiBF$_4$ 0.1 mol/kg | | | 88 | 81 |
| EXAMPLE 4-2 | | CHEMICAL FORMULA 30(6) 0.1 mol/kg | | | 90 | 82 |
| EXAMPLE 4-3 | | CHEMICAL FORMULA 34(2) 0.1 mol/kg | | | 88 | 81 |
| COMPARATIVE EXAMPLE 4 | LiPF$_6$ 0.9 mol/kg | CHEMICAL FORULA 30(6) 0.1 mol/kg | EC + DMC | — CHEMICAL FORMULA 23 | 82 | 77 |

As shown in Table 4, in Examples 4-1 to 4-3 in which the electrolyte salt included LiBF$_4$ higher storage discharge capacity retention ratio than that in Example 1-1 in which the electrolyte salt did not include LiBF$_4$ or the like was obtained, and a cycle discharge capacity retention ratio equal to or higher than that in Example 1-1 was obtained. In Example 4-2 which included FEC as the main solvent, the storage discharge capacity retention ratio and the cycle discharge capacity retention ratio were higher than those in Comparative Example 4 which did not include FEC.

Therefore, it was confirmed that in the secondary battery according to the embodiment of the invention, when the electrolyte salt included the compound represented by Chemical Formula 28 or the compound represented by Chemical Formula 32, higher effects were obtained.

The result in the case where the compound represented by Chemical Formula 31 or 33 is used as the electrolyte salt is not shown here; however, the compounds represented by Chemical Formulas 31 and 33 has the same properties as the compound represented by Chemical Formula 32, so it is obvious that also in the case where the compound represented by Chemical Formula 31 or 33 is used, the same effects as those in the case where the compound represented by Chemical Formula 32 is used are obtained.

Examples 5-1 to 5-6

Secondary batteries were formed by the same steps as those in Examples 1-1 to 1-3, 1-5, 1-6 and 1-8, except that as the anode active material, instead of artificial graphite, silicon was used to form the anode active material layer 22B, and the composition of the solvent was changed. In the case where the anode active material layer 22B was formed, silicon was deposited on the anode current collector 21A by an electron beam evaporation method. Moreover, as the composition of the solvent, as the main solvent, instead of DMC, diethyl carbonate (DEC) was used, and the content of FEC in the solvent was 5 wt %, and the content of the compound represented by Chemical Formula 23 was 1 wt %.

Comparative Example 5-1 to 5-4

Secondary batteries were formed by the same steps as those in Comparative Examples 1-1 to 1-4, except that as in the case of Examples 5-1 to 5-5, silicon was used to form the anode active material layer 22B, and the composition of the solvent was changed.

When the storage characteristics and the cycle characteristics of the secondary batteries of Examples 5-1 to 5-6 and Comparative Example 5-1 to 5-4 were determined, results shown in Table 5 were obtained.

As shown in Table 5, in the case where the silicon was used as the anode active material to form anode active material layer 22B, substantially the same results as those shown in Table 1 were obtained. More specifically, in Example 5-1 to 5-6 which included FEC or the like as the main solvent, and the compound represented by Chemical Formula 23 or the like as the sub solvent, the storage discharge capacity retention ratio was higher than that in Comparative Examples 5-1 to 5-4 which did not include the main solvent and the sub solvent, and the cycle discharge capacity retention ratio was equal or higher. Therefore, it was confirmed that in the secondary battery according to the embodiment of the invention, in the case where the anode 22 included silicon as the anode active material, when the solvent of the electrolytic solution included at least one kind selected from the group consisting of the cyclic carbonate represented by Chemical Formula 11 which included a halogen and the chain carbonate represented by Chemical Formula 12 which included a halogen as the main solvent, and at least one kind selected from the group consisting of the compounds represented by Chemical Formulas 13, 14 and 15, the storage characteristics in a high-temperature atmosphere were improved.

Examples 6-1 to 6-4

Secondary batteries were formed by the same steps as those in Examples 2-1, 1-1, 2-4 and 2-5, except that as in the case of Examples 5-1 to 5-5, silicon was used to form the anode active material layer 22B, and the composition of the solvent was changed.

When the storage characteristics and the cycle characteristics of the secondary batteries of Examples 6-1 to 6-4 were determined, results shown in Table 6 were obtained.

TABLE 5

Anode active material: silicon

| | ELECTROLYTE SALT | SOLVENT MAIN SOLVENT | SUB SOLVENT | AUXILIARY SOLVENT | DISCHARGE CAPACITY RETENTION RATIO (%) STORAGE | CYCLE |
|---|---|---|---|---|---|---|
| EXAMPLE 5-1 | LiPF$_6$ | EC + DEC | FEC | CHEMICAL FORMULA 23 | — | 88 | 61 |
| EXAMPLE 5-2 | 1 mol/kg | | t-DFEC | | | 88 | 78 |
| EXAMPLE 5-3 | | | c-DFEC | | | 88 | 78 |
| EXAMPLE 5-4 | | | FEC | CHEMICAL FORMULA 24 | | 87 | 61 |
| EXAMPLE 5-5 | | | | CHEMICAL FORMULA 25 | | 86 | 60 |
| EXAMPLE 5-6 | | | FEC | CHEMICAL FORMULA 23 | CHEMICAL FORMULA 27 | 89 | 61 |
| COMPARATIVE EXAMPLE 5-1 | LiPF$_6$ 1 mol/kg | EC + DEC | — | — | — | 81 | 40 |
| COMPARATIVE EXAMPLE 5-2 | | | FEC | — | | 84 | 60 |
| COMPARATIVE EXAMPLE 5-3 | | | t-DFEC | — | | 84 | 76 |
| COMPARATIVE EXAMPLE 5-4 | | | — | CHEMICAL FORMULA 23 | | 82 | 42 |

TABLE 6

Anode active material: silicon

| | ELECTROLYTE SALT | SOLVENT | | | | DISCHARGE CAPACITY RETENTION RATIO (%) | |
|---|---|---|---|---|---|---|---|
| | | MAIN SOLVENT | SUB SOLVENT | | | STORAGE | CYCLE |
| EXAMPLE 6-1 | LIPF$_6$ | EC + DEC | FEC | CHEMICAL FORMULA 23 | 0.001 wt % | 85 | 60 |
| EXAMPLE 6-2 | 1 mol/kg | | | | 0.1 wt % | 86 | 61 |
| EXAMPLE 5-1 | | | | | 1 wt % | 88 | 61 |
| EXAMPLE 6-3 | | | | | 5 wt % | 86 | 58 |
| EXAMPLE 6-4 | | | | | 10 wt % | 85 | 56 |
| COMPARATIVE EXAMPLE 5-2 | LIPF$_6$ 1 mol/kg | EC + DEC | FEC | — | — | 84 | 60 |
| COMPARATIVE EXAMPLE 5-4 | | | — | CHEMICAL FORMULA 23 | 1 wt % | 82 | 42 |

As shown in Table 6, the same results as those shown in Table 2 were obtained. More specifically, in Examples 6-1 to 6-4 in which the content of the sub solvent was changed, when the content was within a range from 0.001 wt % to 10 wt % both inclusive, a higher storage discharge capacity retention ratio than that in Comparative Examples 5-2 and 5-4 was obtained. In this case, when the content of the sub solvent was 1 wt % or less, a cycle discharge capacity retention ratio equal to or higher than that in Comparative Examples 5-2 and 5-4 was obtained, and when the content was 0.1 wt % or over, a higher cycle discharge capacity retention ratio was obtained. Therefore, it was confirmed that in the secondary battery according to the embodiment of the invention, when the content of the sub solvent was within a range from 0.001 wt % to 10 wt % both inclusive, the storage characteristics in a high-temperature atmosphere were improved, and when the content was within a range from 0.001 wt % to 1 wt % both inclusive, the cycle characteristics were secured, and when the content was within a range from 0.1 wt % to 1 wt % both inclusive, the cycle characteristics were also improved.

Examples 7-1 to 7-4

Secondary batteries were formed by the same steps as those in Examples 3-1 to 3-4, except that as in the case of Examples 5-1 to 5-5, silicon was used to form the anode active material layer 22B, and the composition of the solvent was changed.

When the storage characteristics and the cycle characteristics of the secondary batteries of Examples 7-1 to 7-4 were determined, results shown in Table 7 were obtained.

As shown in Table 7, the same results as those in Table 3 were obtained. More specifically, in Examples 7-1 to 7-4 in which the solvent included VC or the like, a higher storage discharge capacity retention ratio than that in Example 5-1 in which VC or the like was not included was obtained, and a cycle discharge capacity retention ratio equal to or higher than that in Example 5-1 was obtained. Therefore, it was confirmed that in the secondary battery according to the embodiment of the invention, when the solvent of the electrolytic solution included the cyclic carbonate including an unsaturated bond, a sultone or an acid anhydride, higher effects were obtained.

Examples 8-1 to 8-3

Secondary batteries were formed by the same steps as those in Examples 4-1 to 4-3, except that as in the case of Examples 5-1 to 5-5, silicon was used to form the anode active material layer 22B, and the composition of the solvent was changed.

Comparative Example 8

A secondary battery was formed by the same steps as those in Comparative Example 4, except that as in the case of Examples 5-1 to 5-5, silicon was used to form the anode active material layer 22B, and the composition of the solvent was changed.

When the storage characteristics and the cycle characteristics of the secondary batteries of Examples 8-1 to 8-3 and Comparative Example 8 were determined, results shown in Table 8 were obtained.

TABLE 7

Anode active material: silicon

| | ELECTROLYTE SALT | SOLVENT | | | | DISCHARGE CAPACITY RETENTION RATIO (%) | |
|---|---|---|---|---|---|---|---|
| | | MAIN SOLVENT | | SUB SOLVENT | OTHERS | STORAGE | CYCLE |
| EXAMPLE 5-1 | LIPF$_6$ | EC + DEC | FEC | CHEMICAL FORMULA 23 | — | 88 | 61 |
| EXAMPLE 7-1 | 1 mol/kg | | | | VC | 88 | 68 |
| EXAMPLE 7-2 | | | | | PRS | 89 | 61 |
| EXAMPLE 7-3 | | | | | SCAH | 90 | 63 |
| EXAMPLE 7-4 | | | | | SBAH | 90 | 72 |

TABLE 8

Anode active material: silicon

| | ELECTROLYTE SALT | | SOLVENT | | DISCHARGE CAPACITY RETENTION RATIO (%) | |
| --- | --- | --- | --- | --- | --- | --- |
| | | | MAIN SOLVENT | SUB SOLVENT | STORAGE | CYCLE |
| EXAMPLE 5-1 | | LIPF$_6$ 1 mol/kg | EC + DEC | FEC CHEMICAL FORMULA 23 | 88 | 61 |
| EXAMPLE 8-1 | LIPF$_6$ 0.9 mol/kg | LiBF$_4$ 0.1 mol/kg | | | 89 | 61 |
| EXAMPLE 8-2 | | CHEMICAL FORMULA 30(6) 0.1 mol/kg | | | 89 | 64 |
| EXAMPLE 8-3 | | CHEMICAL FORMULA 34(2) 0.1 mol/kg | | | 90 | 61 |
| COMPARATIVE EXAMPLE 8 | LIPF$_6$ 0.9 mol/kg | CHEMICAL FORULA 30(6) 0.1 mol/kg | EC + DEC | — CHEMICAL FORMULA 23 | 82 | 50 |

As shown in Table 8, the same results as those shown in Table 4 were obtained. More specifically, in Examples 8-1 to 8-3 in which the electrolyte salt included LiBF$_4$ or the like, a higher storage discharge capacity retention ratio than that in Example 5-1 in which LiBF$_4$ or the like was not included was obtained, and a cycle discharge capacity retention ratio equal to or higher than that in Examples 5-1 was obtained. In Examples 8-2 which included FEC as the main solvent, the storage discharge capacity retention ratio and the cycle discharge capacity retention ratio were higher than those in Comparative Example 8 which did not include FEC. Therefore, it was confirmed that in the secondary battery according to the embodiment of the invention, when the electrolyte salt included the compound represented by Chemical Formula 28 or the compound represented by Chemical Formula 32, higher effects were obtained.

It was confirmed from the results shown in Tables 1 to 8 that in the secondary battery according to the embodiment of the invention, irrespective of the kind of the anode active material, when the solvent of the electrolytic solution included at least one kind selected from the group consisting of the cyclic carbonate represented by Chemical Formula 11 which included a halogen and the chain carbonate represented by Chemical Formula 12 which included a halogen as the main solvent, and at least one kind selected from the group consisting of the compounds represented by Chemical Formulas 13, 14 and 15 as the sub solvent, the storage characteristics in a high-temperature atmosphere were improved. Moreover, it was confirmed that when the content of the sub solvent was within a range from 0.001 wt % to 1 wt % both inclusive, the cycle characteristics in a high-temperature atmosphere was secured, and when the content was within a range from 0.1 wt % to 1 wt % both inclusive, the cycle characteristics were also improved.

In this case, compared to the case where a carbon material was used as the anode active material, in the case where silicon was used as the anode active material, the rate of increase of the discharge capacity retention ratio was larger. It was considered that the result was obtained, because when silicon which was advantageous for an increase in capacity was used, compared to the case where the carbon material was used, the electrolytic solution was easily decomposed, so the decomposition inhibition effect of the electrolytic solution was exerted pronouncedly.

Although the present invention is described referring to the embodiment and the examples, the invention is not limited to the embodiment and the examples, and may be variously modified. For example, the application of the electrolytic solution of the invention is not limited to batteries, and the electrolytic solution may be applied to any other electrochemical devices in addition to the batteries. As the other application, for example, a capacitor or the like is cited.

Moreover, in the above-described embodiment and the above-descried examples, the case where the electrolytic solution or the gel electrolyte in which the polymer compound holds the electrolytic solution is used as the electrolyte of the battery of the invention is described; however, any other kind of electrolyte may be used. Examples of the electrolyte include a mixture of an ion-conducting inorganic compound such as ion-conducting ceramic, ion-conducting glass or ionic crystal and an electrolytic solution, a mixture of another inorganic compound and an electrolytic solution, a mixture of the inorganic compound and a gel electrolyte, and the like.

Moreover, in the above-described embodiment and the above-described examples, as the battery of the invention, a lithium-ion secondary battery in which the capacity of the anode is represented by a capacity component based on insertion and extraction of lithium, and a lithium metal secondary battery in which the capacity of the anode is represented by a capacity component based on precipitation and dissolution of lithium are described; however, the invention is not necessarily limited to them. The battery of the invention is applicable to a secondary battery in which the charge capacity of an anode material capable of inserting and extracting lithium is smaller than the charge capacity of a cathode, thereby the capacity of the anode includes a capacity component by insertion and extraction of lithium and a capacity component by precipitation and dissolution of lithium, and is represented by the sum of them in the same manner.

In the above-described embodiment and the above-described examples, the case where lithium is used as an electrode reactant is described; however, any other Group 1A element in the short form of the periodic table of the elements such as sodium (Na) or potassium (K), a Group 2A element in the short form of the periodic table of the elements such as magnesium or calcium (Ca), or any other light metal such as aluminum may be used. Also in this case, as the anode active material, the anode material described in the above-described embodiment may be used.

Further, in the above-described embodiment and the above-described examples, the case where the battery has a cylindrical type, a laminate film type and a coin type, and the case where the battery device has a spirally wound configuration are described as examples; however, the battery of the invention is applicable to the case where a battery has any other shape such as a prismatic type or a button type or the case where the battery device has any other configuration such as a laminate configuration in the same manner. Further, the invention is applicable to not only the secondary batteries but also other kinds of batteries such as primary batteries.

In the above-described embodiment and the above-described examples, an appropriate range, which is derived from the results of the examples, of the content of the compounds represented by Chemical formulas 13, 14 and 15 in the solvent of the electrolytic solution of the invention is described; however, the description does not exclude the possibility that the content is out of the above-described range. More specifically, the above-described appropriate range is a specifically preferable range to obtain the effects of the invention, and as long as the effects of the invention are obtained, the content may be deviated from the above-described range to some extent.

It should be understood by those skilled in the art that various modifications, combinations, sub-combinations and alterations may occur depending on design requirements and other factors insofar as they are within the scope of the appended claims or the equivalents thereof.

What is claimed is:

1. A secondary battery comprising:
   a cathode;
   an anode including an anode active material, wherein the anode active material includes a carbon material;
   an electrolyte solution including a solvent and an electrolyte salt;
   wherein the solvent includes a first solvent and a fourth solvent, and at least one of a second solvent and a third solvent;
   wherein the first solvent includes 4-fluoro-1,3-dioxolane-2-one;
   wherein the second solvent includes Chemical Formula No. 24 represented below:

Chemical Formula 24

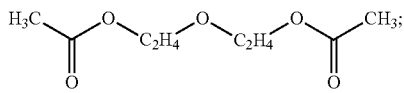

and wherein the third solvent includes Chemical Formula No. 27 represented below:

Chemical Formula 24

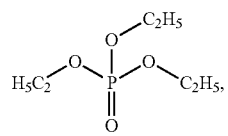

wherein the fourth solvent includes Chemical Formula No. 23 represented below:

Chemical Formula 23

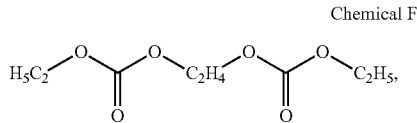

and the amount of Chemical Formula No. 23 in the solvent ranges from 0.1 wt % to 1 wt %.

2. The secondary battery according to claim 1, wherein the solvent of the electrolyte solution further includes at least one of ethylene carbonate, dimethyl carbonate, a vinylene carbonate-based compound, vinylene carbonate, a vinyl ethylene carbonate-based compound, a methylene ethylene carbonate-based compound, a sultone, propene sultone, an acid anhydride, succinic anhydride, or sulfobenzoic anhydride.

3. The secondary battery according to claim 1, wherein the cathode includes a cathode active material including a lithium-cobalt complex oxide.

4. The secondary battery according to claim 1, wherein the electrolyte salt includes lithium hexafluorophosphate.

5. The secondary battery according to claim 1, wherein the carbon material includes graphite.

6. The secondary battery according to claim 1, wherein the anode includes an anode current collector, and wherein the anode active material is provided on the anode current collector.

7. The secondary battery according to claim 1, wherein the secondary battery is a lithium ion secondary battery.

* * * * *